United States Patent
Gent et al.

(10) Patent No.: US 7,266,042 B1
(45) Date of Patent: Sep. 4, 2007

(54) MULTI-STAGE MAXIMUM LIKELIHOOD TARGET ESTIMATOR

(75) Inventors: Kurt Gent, New Bedford, MA (US); Kenneth J. McPhillips, Warren, RI (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 11/398,732

(22) Filed: Mar. 31, 2006

(51) Int. Cl.
*G01S 13/66* (2006.01)

(52) U.S. Cl. ..................................... 367/118; 342/195

(58) Field of Classification Search ................ 367/118; 342/195
See application file for complete search history.

(56) References Cited

U.S. PATENT DOCUMENTS

| | | |
|---|---|---|
| 4,561,076 A | 12/1985 | Gritsch |
| 4,831,602 A | 5/1989 | Kroenert et al. |
| 5,155,706 A | 10/1992 | Haley et al. |
| 5,181,254 A | 1/1993 | Schweizer et al. |
| 5,187,689 A | 2/1993 | Florent |
| 5,214,744 A | 5/1993 | Schweizer et al. |
| 5,315,562 A | 5/1994 | Bradley et al. |
| 5,531,117 A | 7/1996 | Fortes |
| 5,537,119 A | 7/1996 | Poore |
| 5,587,969 A | 12/1996 | Kroemer et al. |
| 5,960,097 A * | 9/1999 | Pfeiffer et al. ......... 342/357.07 |
| 2004/0006424 A1* | 1/2004 | Joyce et al. ........... 342/357.07 |
| 2005/0041102 A1* | 2/2005 | Bongiovanni et al. ...... 348/155 |
| 2005/0280571 A1* | 12/2005 | Abatzoglou et al. ...... 342/25 B |

\* cited by examiner

*Primary Examiner*—Dan Pihulic
(74) *Attorney, Agent, or Firm*—James M. Kasischke; Michael P. Stanley; Jean-Paul A. Nasser

(57) ABSTRACT

A multi-stage maximum likelihood target estimator for use with radar and sonar systems is provided. The estimator is a software implemented algorithm having four computational stages. The first stage provides angle smoothing for data endpoints thereby reducing angle errors associated with tie-down times. The second stage performs a coarse grid search to obtain the initial approximate target state to be used as a starting point for stages 3 and 4. The third stage is an endpoint Gauss-Newton type maximum likelihood target estimate which determines target range along two time lines. The final refinement of the target state is obtained by the fourth stage which is a Cartesian coordinate maximum likelihood target estimate. The four-stage processing allows the use of target historic data while reducing processing time and computation power requirement.

10 Claims, 3 Drawing Sheets

MULTI-STAGE MAXIMUM LIKELIHOOD TARGET ESTIMATOR

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION (1) Field of the Invention

The present invention relates generally to the field of radar and sonar systems. In particular, the invention employs an algorithm in a process for enhanced target detection and tracking.

(2) Description of the Prior Art

State of the art combat systems rely heavily on target motion analysis (TMA) subcomponents. A target motion analysis subcomponent estimates the current position and velocity components of a contact. Estimates from target motion analysis are important to combat personnel because the estimate allows the personnel to predict the location of the hostile contact some time in the future. Precise determination of the future position of the contact is required for accurate targeting of weapons systems as well as for defensive maneuvering and evasion of the contact by friendly units.

In both radar and sonar detection systems, an antenna array receives a reflected signal. Preliminary processing then occurs and the locations of contacts are generated. An example of this type of processing is disclosed in Chang et al., Active Sonar Range-Beam Partitioner, U.S. Pat. No. 5,737,249 (Filed 7 Apr. 1998).

The next stage in processing is to determine range and bearing estimates for each target. Prior attempts have led to two distinct approaches for these determinations. The first approach, (sequential algorithms) uses an averaged measurement to reflect historic information and combines this average in a weighted manner with the most current measurement. This approach yields minimal computational needs due to the small size of the input dataset. Sequential algorithms also can respond quickly to targets that have rapidly varying direction of movement. However, the condensation of all historic measurements into a single set of input numbers results in a great loss in the granularity of the data. Sequential algorithms have not been able to utilize the complete historic dataset to dynamically recompute the output range and bearing as a cache set of input values is received.

Batch processing algorithms have developed to meet this precise need. However, batch processing algorithms have also been plagued with a plethora of problems. First, computational requirements have consistently been exceptionally high. As a result, algorithm designers have been limited in the amount of processing steps which could be performed while still providing real time output. In some circumstances, computational needs have been so high as to require limiting the number of individual historic input measurements which are processed. As such, all viable prior attempts have used a single stage algorithm for processing.

The first type of algorithm often used is grid searching. The grid search technique divides the target space into a number of cells. Contact range and bearing are computed by detecting movement between cells. In order for this technique to be successful, the resolution of the target grid must be very fine. This fine resolution has resulted in extreme computational power requirements.

The second type of algorithm is a stand-alone endpoint coordinate maximum likelihood estimation (MLE). In maximum likelihood estimation, an iterative least-squares technique is used to determine contact range and bearing. However, this approach has been subject to over-sensitivity, especially in cases where iterations on the quadratic solution lead to a divergence rather than a convergence.

SUMMARY OF THE INVENTION

Accordingly, it is an object of the present invention to provide a software algorithm which provides range and bearing estimates for target acquisition systems.

It is a further object of the present invention to minimize computational requirements while processing substantial historic data.

It is a still further object of the present invention to maintain a high granularity or resolution in the target field.

It is a still further object of the present invention to prevent divergence of the least-squares solution and of the target falses which result from such divergence.

In accordance with these and other objects, the invention is a process using a multi-stage algorithm for estimating the current position and velocity components of contacts. The algorithm comprises four major stages. In the first stage, pre-processing aimed at elimination of angle errors associated with the time measurements is developed for use in later stages. In the second stage, a coarse grid search, in endpoint coordinates, is performed to yield a refined range estimate at each of the time measurements. In the third stage, an endpoint Gauss-Newton type maximum likelihood estimation (MLE) solution is performed to yield an accurate range estimate. Finally, in the fourth stage, the computed range and bearing values are refined more precisely through a Cartesian coordinate MLE.

The four-stage process or method provides the advantage of allowing each stage of the algorithm to work with well-defined input data. Additionally, this method allows the overall algorithm to perform computationally heavy operations over a smaller data space.

Also, the initial stage of the operation is held to a coarse estimation requiring little processing power. In this way, the present invention is able to handle large amounts of historic target information without sacrificing resolution in the target space. Furthermore, the procedure of using preprocessing and early estimation stages before the least squares operations in the MLE stages, steps the algorithm from selecting iteration points at local minimums rather than true minimums. This procedure prevents divergence in the solution and prevents the resulting false radar and sonar targets.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

The multistage maximum likelihood estimator (MLE) processes sonar data and computes a target solution (range, bearing, course, speed) and a localization ellipse by processing data in several stages. The algorithm processes azimuthal bearing measurements, direct path or bottom-bounce conical angle measurements, horizontal range, direct path or bottom bounce frequency measurements from multiple trackers and sonar arrays. Frequency data from a maximum of 2 trackers may be processed. The algorithm constraints include a non-maneuvering target at a known depth, a flat ocean bottom, and an isovelocity environment (straight-line sound propagation). The propagation path is constrained to be either direct path or bottom bounce-on ray reversal and the measurement noise is assumed to be uncorrelated. When measurement data has been partitioned into segments, propagation path hypothesis testing is performed.

Figure 1:
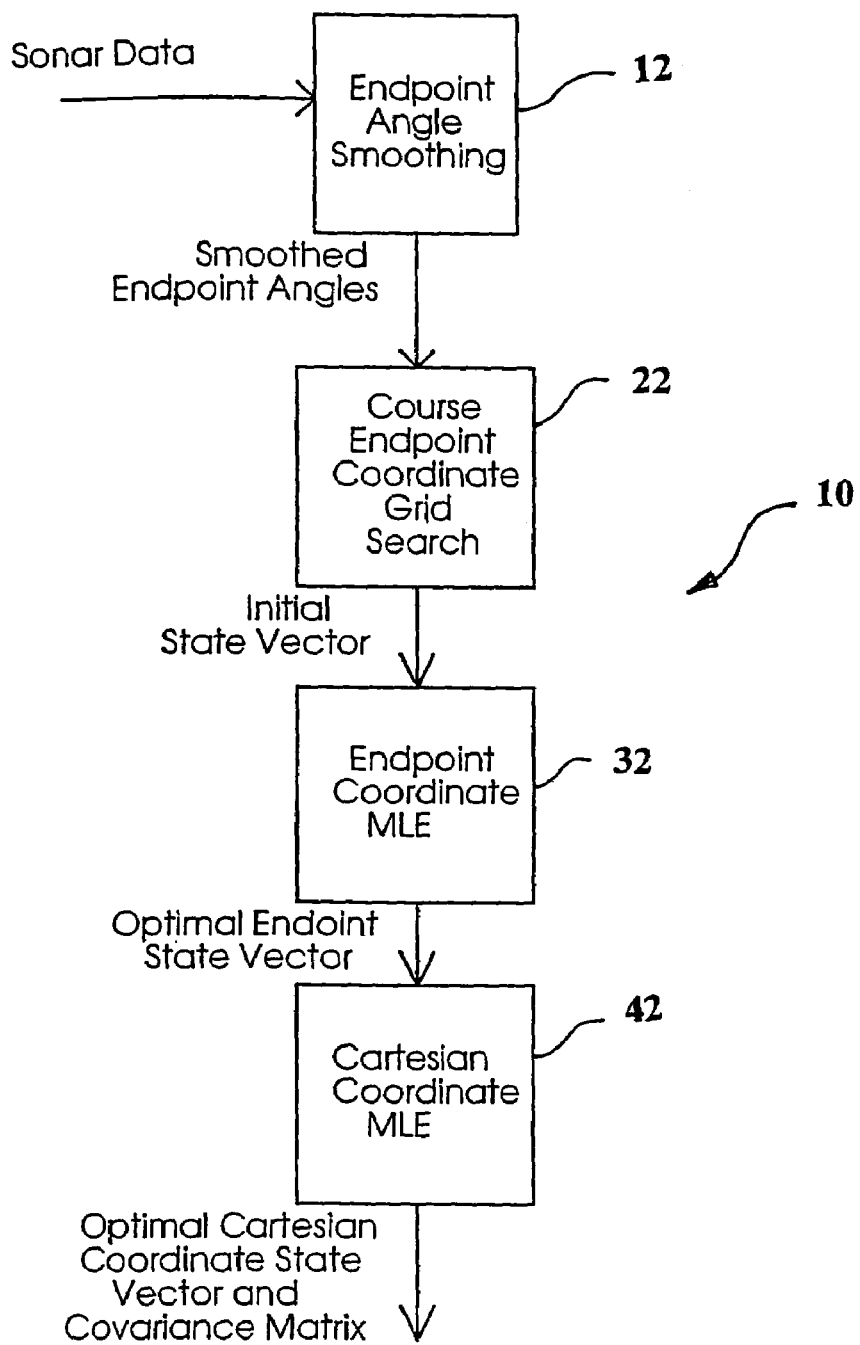
FIG. 1 is a block diagram depicting the multi-stage maximum likelihood estimation (MLE) method.

Referring now to FIG. 1, the overall process 10 is depicted showing the four major stages of the present invention, a endpoint angle smoothing stage 12, a coarse endpoint coordinate grid search stage 22, an endpoint Gauss-Newton type MLE 32, and a fourth stage, the Cartesian coordinate MLE stage 42.

Figure 2:
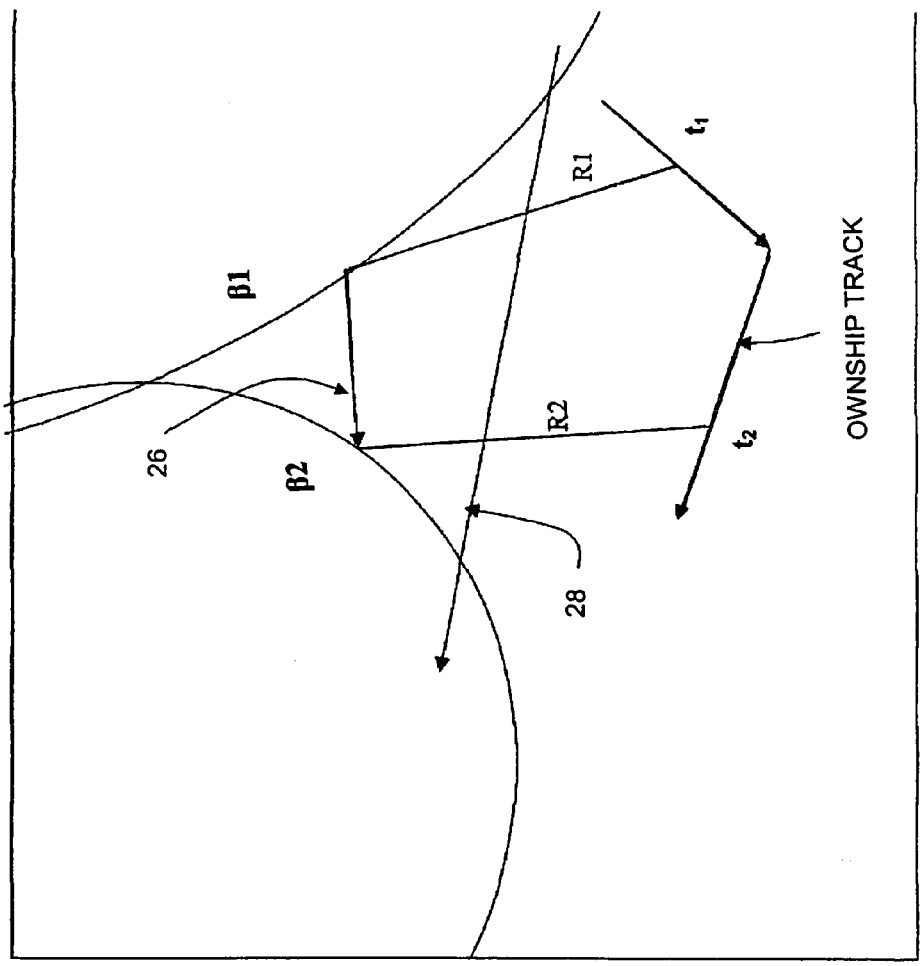
FIG. 2 is a geographic plot of MLE endpoints.

In the first stage 12, the algorithm calculates angle smoothing on the angle measurements at the endpoints of the data window in order to reduce angle errors associated with the tie down times (depicted in FIG. 2 as time line 1 ($t_1$) and time line 2 ($t_2$)) used by the endpoint coarse grid search and endpoint maximum likelihood estimator.

In the second stage 22 of FIG. 1, a coarse grid search in endpoint coordinates is performed to obtain a reasonable initial stage estimate of target range at the two times lines. Referring again to FIG. 2, the target position at time line 1 ($t_1$) and time line 2 ($t_2$) is constrained to lie on either the azimuthal bearing lines or conical angle hyperbolas for bottom bounce propagation or conical angle hyperbolic asymptotes for direct path propagation, thereby producing the constrained track of a target 26. The actual track 28 is depicted showing the convergence of the solution.

Figure 3:
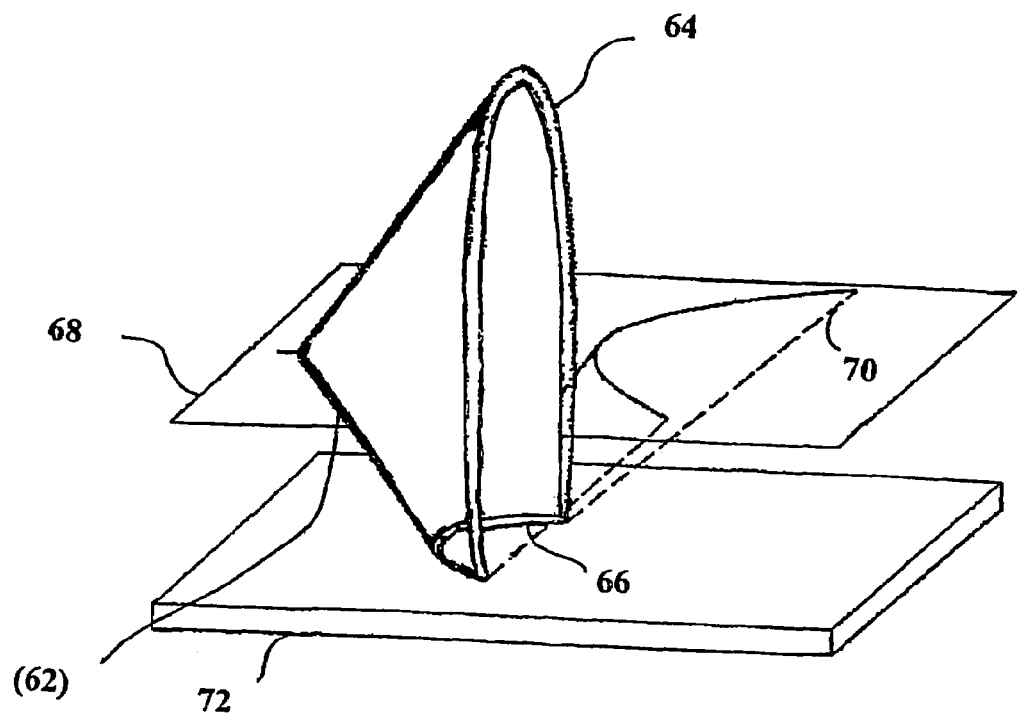
FIG. 3 is a three-dimensional representation of the sonar beam and bottom reflected beam of a towed array sensor.

These target restraints may be better visualized by reference to FIG. 3. In FIG. 3, ownship 62 is submerged at a submarine depth plane 68 with a representation of the sonar-emitted, cone-shaped beam 64. The cone-shaped beam 64 either directly impinges a target or can be reflected off the ocean bottom 72. As shown, the bottom reflection 66 produces a hyperbola. As a result, the reflected beam 70 is a conical angle hyperbola.

In the third stage 32, an endpoint Gauss-Newton type MLE estimates target range at the two times lines along with a target base frequency for a maximum of two frequency trackers. Again, the target position at time line 1 and time line 2 is constrained to lie on either the azimuthal bearing lines, conical angle hyperbolas or conical angle hyperbolic asymptotes.

In the fourth stage 42, the solution is further refined using the Cartesian coordinate MLE, which also provides errors bounds on various target parameters. The Cartesian coordinate MLE is also Gauss-Newton type MLE that estimates target x, y-position and velocity using the same assumptions made by the endpoint MLE.

Endpoint Angle Smoothing

The first stage, the endpoint angle smoothing stage receives input data from the target tracker, in this example, a sonar sensor, and provides preliminary data for follow-on stages. The algorithm performs angle smoothing on the angle measurements at the endpoints of the data window in order to reduce angle errors associated with the tie-down times (referred to as time line 1 and time line 2).

Because the coarse grid search constrains its target solution to lie on the azimuthal bearing lines or conical angle hyperbolae (bottom bounce) or conical angle hyperbolic asymptotes (direct path) at time line 1 and time line 2, significantly noisy measurements at either timeline may result in a significantly biased target solution. In order to avoid biased solutions due to endpoint constraints, the coarse grid search constrains the target track to lie on the smoothed (vice measured) bearing lines or conical angle hyperbolae/asymptotes. The angle measurements from the tracker or trackers associated with time line 1 and time line 2 are smoothed by fitting measurement data collected within a specified time window of either time line 1 or time line 2 with a quadratic model using standard (normal equation) least-squares theory. Sophisticated orthogonalization techniques are simply not necessary in this application.

Assuming a quadratic model, the angle measurements from the tracker associated with time line 1 that are within 120 seconds of time line 1 ($a_1, a_2, \ldots, a_m$) can be described as $$\begin{bmatrix} a_1 \\ a_2 \\ \vdots \\ a_m \end{bmatrix} = \begin{bmatrix} 1 & \Delta t_1 & \frac{\Delta t_1^2}{2} \\ 1 & \Delta t_2 & \frac{\Delta t_2^2}{2} \\ \vdots & \vdots & \vdots \\ 1 & \Delta t_m & \frac{\Delta t_m^2}{2} \end{bmatrix} \begin{bmatrix} a_0 \\ a'_0 \\ a''_0 \end{bmatrix} \quad (1)$$

or $$z = Hx \quad (2)$$

where $\Delta t_i$ is the time of the ith measurement of time line 1
$a_i$ is the ith angle measurement ($-\pi \leq a_i < +\pi$)
$a_0$ is the smoothed angle at time line 1
$a'_0$ is the angle rate at time line 1
$a''_0$ is the angle acceleration at time line 1

The curve fit coefficients (x) can be computed using a standard unweighted normal equation approach as $$x = [H^T H]^{-1} H^T z \quad (3)$$

where the matrix inverse is performed using a standard Gaussian elimination method. In order to tie down to the smoothed angle at time line 1, the smoothed angle estimate $a_0$ can be substituted for the measured angle at time line 1.

In similar fashion, a smoothed angle estimate at time line 2 can be generated using tracker data associated with the time line 2 tracker that is within 120 seconds of time line 2, and this smoothed angle can also be substituted for the measured angle at time line 2.

If the root mean square (RMS) error of the curve fit at either time line exceeds 3°, then the smoothed angle estimates shall be discarded.

Coarse Grid Search

The coarse grid search can process frequency data for up to two separate frequency trackers. For improved clarity, only a single frequency tracker is described.

1. Where at least three frequency measurements are available for a given frequency tracker, frequency data from that tracker is processed and the estimated base frequency for that tracker (Fb) is set to the most recent frequency measurement.

2. Set the minimum and maximum range at t1 with respect to the sensor associated with time line 1 ($R1_{min}$, $R1_{max}$) and the minimum and maximum range at t2 with respect to the sensor associated with time line 2 ($R2_{min}$, $R2_{max}$) as follows:
   a. If the measurement at time line 1 is a bearing, set the minimum range at t1 with respect to the sensor associated with time line 1 ($R1_{min}$) to the minimum range constraint which is defaulted to 100.
   b. If the measurement at time line 1 is a conical angle, compute the minimum range at t1 with respect to the sensor associated with time line 1 ($R1_{min}$). If $R1_{min}$ is less than the minimum range constraint, set $R1_{min}$ to the minimum range constraint which is defaulted to 100. The minimum range with respect to the sensor is computed as follows:
      i. Compute the plane depth (Rz) associated with a measurement as follows:
         1.) If the propagation path is direct (zero ray reversals), then the image plane depth is computed as follows:

$$Rz = Zt - Zs \qquad (4)$$

where Zt is the assumed target depth and
Zs is the sensor depth
         2.) If the propagation path is bottom bounce (one ray reversal), then the image plane depth is computed as follows:

$$Rz = 2Zb - Zs - Zt \qquad (5)$$

where Zb is the bottom depth.
      ii. Compute the maximum D/E angle with respect to the sensor ($\theta$ max). If the measured conical angle ($\beta$m) is between 0 and $\pi/2$ inclusive, $$\theta_{max} = \beta_n - C_s \qquad (6)$$

where $C_s$ is the sensor cant angle. If the measured conical angle is less than $\pi$, $$\theta_{max} = \pi - \beta_m + C_s \qquad (7)$$

iii. The minimum range with respect to the sensor ($R_{min}$) can then be computed as $$R_{\min} = \frac{R_z}{\tan\theta_{\max}} \qquad (8)$$

where $R_z$ is the image plane depth.
   c. Set the maximum range t1 with respect to the sensor associated with time line 1 ($R1_{max}$) to the maximum range constraint which is defaulted to 200000.
   d. If the measurement at time line 2 is a bearing, set the minimum range at t2 with respect to the sensor associated with time line 2 ($R2_{min}$) to the minimum range constraint which is defaulted to 100.
   e. If the measurement at time line 2 is a conical angle, compute the minimum range at t2 with respect to the sensor associated with time line 2 ($R2_{min}$). If $R2_{min}$ is less than the minimum range constraint, set $R2_{min}$ to the minimum constraint which is defaulted to 100. The minimum range with respect to the sensor is computed as for equations (4) thru (8).
   f. Set the maximum range at t2 with respect to the sensor associated with time line 2 ($R2_{max}$) to the maximum range constraint which is defaulted to 200000.

3. Compute three values of range at t1 with respect to the sensor associated with time line 1 ($R1_j$, j=1, ..., 3) and three values of range at t2 with respect to the sensor associated with time line 2 ($R2_k$, k=1, ..., 3) as follows:

$$R1_j = R1_{min} + 5000j \qquad (9)$$

$$R2_k = R2_{min} + 5000k \qquad (10)$$

If $R1_j > R1_{max}$, set $R1_j$ to $R1_{max}$. If $R2_k > R2_{max}$, set $R2_k$ to $R2_{max}$.

4. If frequency data is being processed from a particular tracker, then five base frequency estimates ($Fb_l$, l=1, ..., 5) are computed as follows:

$$Fb_l = Fr_{avg} + 0.005(l-1) \qquad (11)$$

where $Fr_{avg}$ is averaged measured frequency measurement between t1 and t2.

5. For each combination of $R1_j, R2_k, Fb_l$ compute the Endpoint coordinate performance index ($PI_{jkl}$) as follows:
   a. Compute Endpoint Parameters as follows:
      i. If the measurement at time line 1 is a bearing, set true bearing at t1 with respect to the sensor associated with time line 1 (B1) to the bearing estimate at time line 1.
      ii. If the measurement at time line 1 is a conical angle,
         1.) Compute the target image depth at t1 with respect to the sensor associated with time line 1 (Rz1) as described in for equations (4) and (5).
         2.) Compute the maximum depression/elevation (D/E) angle at t1 with respect to the sensor associated with time line 1 ($\theta1_{max}$) as described for equations (6) thru (8).
         3.) Compute the slant range at t1 with respect to the sensor associated with time line 1 (Rs1):

$$Rs1 = \sqrt{R1^2 + Rz1^2} \qquad (12)$$

4.) Compute the D/E angle at t1 with respect to the sensor associated with time line 1 ($\theta1$):

$$\theta1 = \sin^{-1}\left(\frac{Rz1}{Rs1}\right) \qquad (13)$$

5.) If $\theta1 > \theta1_{max}$, the D/E angle is invalid and processing shall terminate.
         6.) Compute the cosine of relative bearing at t1 with respect to the sensor associated with time line 1 (cBr1) as follows:

$$cBr1 = \frac{\cos\beta1 + \sin Cs1 \sin\theta1}{\cos Cs1 \cos\theta1} \qquad (14)$$

where Cs1 is the cant angle at t1 of the sensor associated with time line 1
$\beta1$ is the conical angle estimate at time line 1.
         7.) Insure that $-0.99999 < cBr1 < 0.99999$.
         8.) Compute the relative bearing at t1 with respect to the sensor associated with time line 1 (Br1) as follows:

$$Br1 = \cos^{-1} cBr1 \qquad (15)$$

9.) If the port/starboard assumption for time line 1 indicates port, set $Br1=2\pi-Br1$.

10.) Compute the true bearing at t1 with respect to the sensor associated with time line 1 (B1) as follows:

$$B1 = Br1 + Hs1 \qquad (16)$$

where Hs1 is the heading at $t_i$ of the sensor associated with time line 1.

iii. If the measurement at time line 2 is a bearing, set true bearing at t2 with respect to the sensor associated with time line 2 (B2) to the bearing estimate at time line 2.

iv. If the measurement at time line 2 is a conical angle,

1.) Compute the target image depth at t2 with respect to the sensor associated with time line 2 (Rz2) as described for equations (4) and (5).

2.) Compute the maximum D/E angle at t2 with respect to the sensor associated with time line 2 ($\theta 2_{max}$) as described for equations (6) thru (8).

3.) Compute the slant range at t2 with respect to the sensor associated with time line 2 (Rs2):

$$Rs2 = \sqrt{R2^2 + Rz2^2} \qquad (17)$$

4.) Compute the D/E angle at t2 with respect to the sensor associated with time line 2 ($\theta 2$):

$$\theta 2 = \sin^{-1}\left(\frac{Rz2}{Rs2}\right) \qquad (18)$$

5.) If $\theta 2 \geq \theta 2_{max}$, the D/E angle is invalid and processing shall terminate.

6.) Compute the cosine of relative bearing at t2 with respect to the sensor associated with time line 2 (cBr2) as follows:

$$cBr2 = \frac{\cos\beta 2 + \sin Cs2 \sin\theta 2}{\cos Cs2 \cos\theta 2} \qquad (19)$$

where Cs2 is the cant angle at t2 of the sensor associated with time line 2

$\beta 2$ is the conical angle estimate at time line 2.

7.) Insure that $-0.99999 < cBr2 < 0.99999$.

8.) Compute the relative bearing at t2 with respect to the sensor associated with time line 2 (Br2) as follows:

$$Br2 = \cos^{-1} cBr2 \qquad (20)$$

9.) If the port/starboard assumption for time line 2 indicates port set $Br2 = 2\pi - Br2$.

10.) Compute the true bearing at t2 with respect to the sensor associated with time line 2 (B2) as follows:

$$B2 = Br2 + Hs2 \qquad (21)$$

where Hs2 is the heading at t2 of the sensor associated with time line 2.

b. For each measurement in the batch:

i. Compute the x-component of range $t_i$ with respect to the sensor associated with the ith measurement ($Rx_i$) and the y-component of range at $t_i$ with respect to the sensor associated with the ith measurement ($Ry_i$):

$$T1_i = \frac{t_i - t1}{t2 - t1} \qquad (22)$$

$$T2_i = 1 - T1_i \qquad (23)$$

$$Rx_i = T2_i R1_j \sin B1 + T1_i R2_k \sin B2 + T1_i(Xs2 - Xs1) - (Xs_i - Xs1) \qquad (24)$$

$$Ry_i = T2_i R1_j \cos B1 + T1_i R2_k \cos B2 + T1_i(Ys2 - Ys1) - (Ys_i - Ys1) \qquad (25)$$

where $Xs_i$ is the x-coordinate of the position at $t_i$ of the sensor associated with the ith measurement $Ys_i$ is the y-coordinate of the position at $t_i$ of the sensor associate with the ith measurement $t_i$ the time of the ith measurement ii. If the ith measurement is a bearing, the following shall be performed:

1.) Compute the true bearing at $t_i$ with respect to the sensor associated with the ith measurement ($B_i$):

$$B_i = \tan^{-1}\left(\frac{Rx_i}{Ry_i}\right) \qquad (26)$$

2.) Compute the bearing residual ($RESB_i$) such that $-\pi \leq RESB_i \leq \pi$:

$$RESB_i = Bm_i - B_i \qquad (27)$$

where $Bm_i$ is the measured bearing at $t_i$

3.) Compute the normalized bearing residual ($\overline{RESB_i}$):

$$\overline{RESB_i} = \frac{RESB_i}{\sigma B_i} \qquad (28)$$

where $\sigma B_i$ is the standard deviation of the measured bearing at $t_i$ iii. If the ith measurement is a conical angle, the following shall be performed:

1.) Compute the target image depth at $t_i$ with respect to the sensor associated with ith measurement ($Rz_i$) as described for equations (4) and (5).

2.) Compute the maximum D/E angle at $t_i$ with respect to the sensor associated with the ith measurement ($\theta_{maxi}$) as described for equations (6) thru (8).

3.) Compute the slant range at $t_i$ with respect to the sensor associated with the ith measurement ($Rs_i$):

$$Rs_i = \sqrt{Rx_i^2 + Ry_i^2 + Rz_i^2} \qquad (29)$$

4.) Compute the D/E angle at $t_i$ with respect to the sensor associated with the ith measurement ($\theta_i$):

$$\theta_i = \sin^{-1}\left(\frac{Rz_i}{Rs_i}\right) \qquad (30)$$

5.) If $\theta_i < \theta_{maxi}$, the D/E angle is valid and the following shall be performed:

a Compute the x-component of range at $t_i$ with respect to the sensor associated with the ith measurement ($xta_i$), the y-component of range at $t_i$ with respect to the sensor associated with the ith measurement ($yta_i$) and the z-component of range at $t_i$ with respect to the sensor associated with the ith measurement rotated to the axis of the array ($zta_i$)

$$xta_i = Rx_i \cos Hs_i - Ry_i \sin Hs_i \quad (31)$$

$$yta_i = (Rx_i \sin Hs_i + Ry_i \cos Hs_i)\cos Cs_i - Rz_i \sin Cs_i \quad (32)$$

$$zta_i = (Rx_i \sin Hs_i + Ry_i \cos Hs_i)\sin Cs_i + Rz_i \cos Cs_i \quad (33)$$

where $CS_i$ is the cant angle at $t_i$ of the sensor associated with the ith measurement $Hs_i$ is the heading at $t_i$ of the sensor associated with the ith measurement b Compute the conical angle at ti with respect to the sensor associated with the ith measurement ($\beta_i$):

If $yta_i \neq 0$ $$\beta_i = \tan^{-1}\left(\frac{\sqrt{xta_i^2 + zta_i^2}}{yta_i}\right) \quad (34)$$

otherwise $$\beta_i = \frac{\pi}{2} \quad (35)$$

c. Compute the conical angle residual ($RES\beta_i$) such that $-\pi \leq RES\beta_i \leq \pi$:

$$RES\beta_i = \beta m_i - \beta_1 \quad (36)$$

where $\beta m_i$ is the measured conical angle at $t_i$.

d. Compute the normalized conical angle residual ($\overline{RES\beta_i}$):

$$\overline{RES\beta_i} = \frac{RES\beta_i}{\sigma\beta_i} \quad (37)$$

where $\sigma\beta_i$ is the standard deviation of the measured conical angle at $t_i$.

iv. If the ith measurement is a horizontal range:
1.) Compute the range at $t_i$ with respect to the sensor associated with the ith measurement ($R_i$):

$$R_i = \sqrt{Rx_i^2 + Ry_i^2} \quad (38)$$

2.) Compute the range residual ($RESR_i$):

$$RESR_i = Rm_i - R_i \quad (39)$$

where $Rm_i$ is the measured range at $t_i$.

3.) Compute the normalized range residual ($\overline{RESR_i}$):

$$\overline{RESR_i} = \frac{RESR_i}{\sigma R_i} \quad (40)$$

where $\sigma R_i$ is the standard deviation of the measured range at $t_i$.

v. If the ith measurement is a frequency and frequency data are being processed:
1.) Compute the target image at $t_i$ with respect to the sensor associated with the ith measurement ($Rz_i$) as described for equations (4) and (5).
2.) Compute the maximum D/E angle at $t_i$ with respect to the sensor associated with the ith measurement ($\theta_{maxi}$) as described for equations (6) thru (8).
3.) Compute the slant range at $t_i$ with respect to the sensor associated with the ith measurement ($Rs_i$):

$$Rs_i = \sqrt{Rx_i^2 + Ry_i^2 + Rz_i^2} \quad (41)$$

4.) Compute the D/E angle at $t_i$ with respect to the sensor associated with the ith measurement ($\theta_i$):

$$\theta_i = \sin^{-1}\left(\frac{Rz_i}{Rs_i}\right) \quad (42)$$

5.) If $\theta_i < \theta_{maxi}$, the D/E angle is valid and the following shall be performed:
a Compute the x-component of target velocity (Vxt) and the y-component of target velocity (Vyt):

$$Vxt = \frac{R2_k \sin B2 + Xs2 - R1_j \sin B1 - Xs1}{t2 - t1} \quad (43)$$

$$Vyt = \frac{R2_k \cos B2 + Ys2 - R1_j \cos B1 - Ys2}{t2 - t1} \quad (44)$$

b. Compute the frequency at $t_i$ with respect to the sensor associated with the ith measurement ($F_i$):

$$F_i = Fb\frac{cRs_i + Vxs_i Rx_i + Vys_i Ry_i}{cRs_i + VxtRx_i + VytRy_i} \quad (45)$$

where c is the average speed of sound.

c. Compute the frequency residual ($\overline{RESF_i}$):

$$RESF_i = Fm_i - F_i \quad (46)$$

where $Fm_i$ is the measured frequency at $t_i$.

d. Compute the normalized frequency residual ($\overline{RESF_i}$):

$$\overline{RESF_i} = \frac{RESF_i}{\sigma F_i} \quad (47)$$

where $\sigma F_i$ is the standard deviation of the measured frequency at $t_i$.

c. If a range constraint is being imposed, then the following computations shall be performed:
   i. Compute the target range (R) as follows:

$$R = \sqrt{Rx_i^2 + Ry_i^2} \quad (48)$$

ii. Compute the range residual (RESR):

$$RESR = Rc - R \quad (49)$$

where Rc is the assumed target range.
   iii. Compute the normalized range residual ($\overline{RESR}$):

$$\overline{RESR} = \frac{RESR}{\sigma R} \quad (50)$$

where σR is the standard deviation of the assumed target range.

d. If a speed constraint is being imposed, then the following computations shall be performed:
   i. Compute the x-component of target velocity (Vxt) and the y-component of target velocity (Vyt):

$$Vxt = \frac{R2_k \sin B2 + Xs2 - R1_j \sin B1 - Xs1}{t2 - t1} \quad (51)$$

$$Vyt = \frac{R2_k \cos B2 + Ys2 - R1_j \cos B1 - Ys1}{t2 - t1} \quad (52)$$

ii. Compute the target speed (V):

$$V = \sqrt{Vxt^2 + Vyt^2} \quad (52)$$

iii. Compute the speed residual (RESV):

$$RESV = Vc - V \quad (54)$$

where Vc is the assumed target speed.
   iv. Compute the normalized speed residual ($\overline{RESV}$):

$$\overline{RESV} = \frac{RESV}{\sigma V} \quad (55)$$

where σV is the standard deviation of the assumed target speed.

e. Compute the Endpoint coordinate performance index ($PI_{jkl}$) as the square root of the mean of the squared normalized residuals, which include measurements as well as constraints.

6. Select the value of $R1_j$, $R2_k$ and $Fb_l$ associated with the smallest $PI_{jkl}$.

Then assuming zero mean unit variance measurements, $R^{-1} = I$,

The non-linear, least-squares algorithm, which employs Householder transformations, applies to both the third and fourth stages of the target estimator, the endpoint MLE and the Cartesian coordinate MLE. The sequence of operations are:

Initialization
$x_1 = x_0$
$1 = 1$, NITER          Gauss-Newton iterations

-continued

| | |
|---|---|
| i = 1,m | measurement loop m = # of measurements |
| H = ∂h($x_{1-1}$)/∂x | Jacobian matrix m × ns<br>ns = # of state variables |
| Z = z − h($x_{1-1}$) | residual vector m × 1 |
| H = [H\|z] | augmented Jacobian m × (ns + 1) |
| A = QH Householder Transformation | |
| $= \begin{bmatrix} U & Y \\ 0 & d \end{bmatrix}$ | U upper triangular ns × ns<br>Y is normalized residual ns × 1 |
| P = $U^{-1}U^{-t}$ | state covariance matrix ns × ns |
| Δx = $U^{-1}Y$ | correction vector ns × 1 |
| PI = ½[z − h($x_{1-1}$)]$R^{-1}$[z − h($x_{1-1}$)] | initial performance index (scalar) |
| $X_1 = x_{1-1} + \alpha \Delta x$ | state update<br>α = stepsize via line search |
| PI' = ½[z − h($x_1$)] $R^{-1}$[z − h($x_1$)] | updated performance index |
| ΔPI = (PI − PI')/PI' | change in performance index |
| if ΔPI < threshold, exit loop | convergence test |

Endpoint Coordinate MLE

The endpoint coordinate MLE can process frequency data for up to two separate frequency trackers. For improved clarity, only a single frequency tracker is described.

1. Initialize the following Endpoint coordinate MLE solution parameters to zero:
   Roc (range with respect to own ship at current time)
   Boc (bearing with respect to own ship at current time)
   Ct (target course)
   Vt (target speed)
   Fb (target base frequency)

2. Initialize the number of Gauss-Newton iterations to zero. A maximum of twenty-five Gauss-Newton iterations shall be performed as described in paragraphs 15a through 15r.

3. Determine the number of state variables as follows: If a least three frequency measurements are available, then frequency data will be processed, target base frequency shall be estimated and the number of states (ns) shall be set to three. Otherwise, the number of state variables shall be two, frequency data shall not be processed and target base frequency shall not be estimated.

4. Initialize values for range at t1 with respect to the sensor associated with time line 1 (R1) and range at t2 with respect to the sensor associated with time line 2 (R2) using the outputs from the coarse grid search.

$$R1 = R1_{init} \quad (56)$$

$$R2 = R2_{init} \quad (57)$$

where $R1_{init}$ and $R2_{init}$ are output by the grid search algorithm
   t1 is the time line 1 time
   t2 is the time line 2 time 5. If frequency is being processed, initialize the base frequency state (Fb) with the base frequency output by the coarse gird search algorithm.

6. Compute the Endpoint coordinate performance index (PI) based on the initial states as follows:
   a. First compute endpoint parameters:
      i. If the measurement at time line 1 is a bearing, set true bearing at t1 with respect to the sensor associated with time line 1 (B1) to the bearing estimate at time line 1.

ii. If the measurement at time line 1 is a conical angle,
  1.) Compute the target image depth at t1 with respect to the sensor associated with time line 1 (Rz1) as described for equations (4) and (5).
  2.) Compute the maximum depression/elevation (D/E) angle at t1 with respect to the sensor associated with time line 1 ($\theta1$ max) as described for equations (6) thru (8).
  3.) Compute the slant range at t1 with respect to the sensor associated with time line 1 (Rs1):

$$Rs1 = \sqrt{R1^2 + Rz1^2} \tag{58}$$

4.) Compute the D/E angle at t1 with respect to the sensor associated with time line 1 ($\theta1$):

$$\theta1 = \sin^{-1}\left(\frac{Rz1}{Rs1}\right) \tag{59}$$

5.) If $\theta1 > \theta1_{max}$, the D/E angle is invalid and processing shall terminate.
  6.) Compute the cosine of relative bearing at t1 with respect to the sensor associated with time 1 (cBr1) as follows:

$$cBr1 = \frac{\cos\beta1 + \sin Cs1\sin\theta1}{\cos Cs1\cos\theta1} \tag{60}$$

where Cs1 is the cant angle at t1 of the sensor associated with time line 1
  $\beta1$ is the conical angle estimate at time line 1
  7.) Insure that $-0.99999 < cBr1 < 0.99999$.
  8.) Compute the relative bearing at t1 with respect to the sensor associated with time line 1 (Br1) as follows:

$$Br1 = \cos^{-1} cBr1 \tag{61}$$

9.) If the port/starboard assumption for time line 1 indicates port, set Br1=$2\pi$−Br1.
  10.) Compute the tear bearing at t1 with respect to the sensor associated with time line 1 (B1) as follows:

$$B1 = Br1 + Hs1 \tag{62}$$

where Hs1 is the heading at t1 of the sensor associated with time line 1.

iii. If the measurement at time line 2 is a bearing, set true bearing at t2 with respect to the sensor associated with time line 2 (B2) to the bearing estimate at time line 2.

iv. If the measurement at time line 2 is a conical angle,
  1.) Compute the target image depth at t2 with respect to the sensor associated with time line 2 (Rz2) as described for equations (4) and (5).
  2.) Compute the maximum D/E angle at t2 with respect to the sensor associated with time line 2 ($\theta2_{max}$) as described for equations (6) thru (8).
  3.) Compute the slant range at t2 with respect to the sensor associated with time line 2 (Rs2):

$$Rs2 = \sqrt{R2^2 + Rz2^2} \tag{63}$$

4.) Compute the D/E angle at t2 with respect to the sensor associated with time line 2 ($\theta2$):

$$\theta2 = \sin^{-1}\left(\frac{Rz2}{Rs2}\right) \tag{64}$$

5.) If $\theta2 > \theta2_{max}$, the D/E angle is invalid and processing shall terminate.
  6.) Compute the cosine of relative bearing at t2 with respect to the sensor associated with time line 2 (cBr2) as follows:

$$CBr2 = \frac{\cos\beta2 + \sin Cs2\sin\theta2}{\cos Cs\cos\theta2} \tag{65}$$

where Cs2 is the cant angle at t2 of the sensor associated with time line 2 and $\beta2$ is the conical angle estimate at time line 2
  7.) Insure that $-0.99999 < cBr2 < 0.99999$.
  8.) Compute the relative bearing at t2 with respect to the sensor associated with time line 2 (Br2) as follows:

$$Br2 = \cos^{-1} cBr2 \tag{66}$$

9.) If the port/starboard assumption for time line 1 indicates port, set Br2=$2\pi$−Br2.
  10.) Compute the true bearing at t2 with respect to the sensor associated with time line 2 (B2) as follows:

$$B2 = Br2 + Hs2 \tag{67}$$

where Hs2 is the heading at t2 of the sensor associated with time line 2 b. Second, for each measurement in the batch:
  i. Compute the x-component of range at $t_i$ with respect to the sensor associated with the ith measurement ($Rx_i$) and the y-component of range at $t_i$ with respect to the sensor associated with the ith measurement ($Ry_i$):

$$T1_i = \frac{t_i - t1}{t2 - t1} \tag{68}$$

$$T2_i = 1 - T1_i \tag{69}$$

$$Rx_i = T2_i R1 \sin B1 + T1_i R2 \sin B2 + T1_i(Xs2 - Xs1) - (Xs_i - Xs1) \tag{70}$$

$$Ry_i = T2_i R1 \cos B1 + T1_i R2 \cos B2 + T1_i(Ys2 - Ys1) - (Ys_i - Ys1) \tag{71}$$

where $Xs_i$ is the x-coordinate of the position at $t_i$ of the sensor associated with the ith measurement
  $Ys_i$ is the y-coordinate of the position at $t_i$ of the sensor associated with the ith measurement
  $t_i$ is the time of the ith measurement ii. If the ith measurement is a bearing, the following shall be performed:
    1.) Compute the true bearing at $t_i$ with respect to the sensor associated with the ith measurement ($B_i$):

$$B_i = \tan^{-1}\left(\frac{Rx_i}{Ry_i}\right) \tag{72}$$

2.) Compute the bearing residual (RESb$_i$) such that $-\pi \leq RESb_i \leq \pi$:

$$RESb_i = Bm_i - B_i \quad (73)$$

where Bm$_i$ is the measured bearing at t$_i$

3.) Compute the normalized bearing residual ($\overline{RESb_i}$):

$$\overline{RESb_i} = \frac{RESb_i}{\sigma b} \quad (74)$$

where σb$_i$ is the standard deviation of the measured bearing at t$_i$.

iii. If the ith measurement is a conical angle, the following shall be performed:

1.) Compute the target image depth at t$_i$ with respect to the sensor associated with the ith measurement (Rz$_i$) as described for equations (4) and (5).

2.) Compute the maximum D/E angle at t$_i$ with respect to the sensor associated with the ith measurement ($\theta_{maxi}$) as described for equations (6) thru (8).

3.) Compute the slant range at t$_i$ with respect to the sensor associated with the ith measurement (Rs$_i$).

$$Rs_i = \sqrt{Rx_i^2 + Ry_i^2 + Rz_i^2} \quad (75)$$

4.) Compute the D/E angle at t$_i$ with respect to the sensor associated with the ith measurement ($\theta_i$):

$$\theta_i = \sin^{-1}\left(\frac{Rz_i}{Rs_i}\right) \quad (76)$$

5.) If $\theta_i < \theta_{maxi}$, the D/E angle is valid and the following shall be performed:

a. Compute the x-component of range at t$_i$ with respect to the sensor associated with the ith measurement (xta$_i$), the y-component of range at t$_i$ with respect to the sensor associated with the ith measurement (yta$_i$) and the z-component of range at t$_i$ with respect to the sensor associated with the ith measurement (zta$_i$) rotated to the axis of the array:

$$xta_i = Rx_i \cos Hs_i - Ry_i \sin Hs_i \quad (77)$$

$$yta_i = (Rx_i \sin Hs_i + Ry_i \cos Hs_i)\cos Cs_i - Rz_i \sin Cs_i \quad (78)$$

$$zta_i = (Rx_i \sin Hs_i + Ry_i \cos Hs_i)\sin Cs_i - Rz_i \cos Cs_i \quad (79)$$

where Cs$_i$ is the cant angle at t$_i$ of the sensor associated with the ith measurement and Hs$_i$ is the heading at t$_i$ of the sensor associated with the ith measurement b. Compute the conical angle at t$_i$ with respect to the sensor associated with the ith measurement ($\beta_i$):

If yta$_i \neq 0$:

$$\beta_i = \tan^{-1}\left(\frac{\sqrt{xta_i^2 + zta_i^2}}{yta_i}\right) \quad (80)$$

otherwise:

$$\beta_i = \frac{\pi}{2} \quad (81)$$

c. Compute the conical angle residual (RESβ$_i$) such that $-\pi \leq RES\beta_i \leq \pi$:

$$RES\beta_i = \beta m_i - \beta_i \quad (82)$$

where βm$_i$ is the measured conical angle at t$_i$ d. Compute the normalized conical angle residual ($\overline{RES\beta_i}$):

$$\overline{RES\beta_i} = \frac{RES\beta_i}{\sigma\beta_i} \quad (83)$$

where σβ$_i$ is the standard deviation of the measured conical angle at t$_i$ iv. If the ith measurement is a horizontal a range:

1.) Compute the range residual (RESr$_i$):

$$RESr_i = Rm_i - R_i$$

where Rm$_i$ is the measured range at t$_i$.

2.) Compute the normalized range residual ($\overline{RESr_i}$):

$$\overline{RESr_i} = \frac{RESr_i}{\sigma r_i} \quad (84)$$

where σr$_i$ is the standard deviation of the measured range at t$_i$.

v. If the ith measurement is a frequency and frequency data are being processed, then the following shall be performed:

1.) Compute the target image depth at t$_i$ with respect to the sensor associated with the ith measurement (Rz$_i$).

2.) Compute the maximum D/E angle at t$_i$ with respect to the sensor associated with the ith measurement ($\theta_{maxi}$).

3.) Compute the slant range at t$_i$ with respect to the sensor associated with the ith measurement (Rs$_i$):

$$Rs_i = \sqrt{Rx_i^2 + Ry_i^2 + Rz_i^2} \quad (85)$$

4.) Compute the D/E angle at t$_i$ with respect to the sensor associated with the ith measurement ($\theta_i$):

$$\theta_i = \sin^{-1}\left(\frac{Rz_i}{Rs_i}\right) \quad (86)$$

5.) If $\theta_i < \theta_{maxi}$ the D/E angle is valid and the following shall be performed:

a. Compute the x-component of target velocity (Vxt) and the y-component of target velocity (Vyt):

$$Vxt = \frac{R2\sin B2 + Xs2 - R1\sin B1 - Xs1}{t2 - t1} \quad (87)$$

$$Vyt = \frac{R2\cos B2 + Ys2 - R1\cos B1 - Ys1}{t2 - t1} \quad (88)$$

b. Compute the frequency at $t_i$ with respect to the sensor associated with the ith measurement ($f_i$):

$$f_i = Fb\frac{cRs_i + Vxs_iRx_i + Vys_iRy_i}{cRs_i + VxtRx_i + VytRy_i} \quad (89)$$

where c is the average speed of sound.

c. Compute the frequency residual ($RESf_i$):

$$RESf_i = fm_i - f_i \quad (90)$$

where $fm_i$ is the measured frequency at $t_i$.

d. Compute the normalized frequency residual ($\overline{RESf_i}$):

$$\overline{RESf}_i = \frac{RESf_i}{\sigma f_i} \quad (91)$$

where $\sigma f_i$ is the standard deviation of the measured frequency at $t_i$.

c. If a range constraint is being imposed, then the following processing shall be performed:
i. Compute the range residual (RESr):

$$RESr = Rc - R \quad (92)$$

where Rc is the assumed target range.

ii. Compute the normalized range residual ($\overline{RESr}$):

$$\overline{RESr} = \frac{RESr}{\sigma R} \quad (93)$$

where σR is the assumed target range standard deviation.

d. If a speed constraint is being imposed, then the following processing shall be performed:
i. Compute the x-component of target velocity (Vxt) and the y-component of target velocity (Vyt):

$$Vxt = \frac{R2\sin B2 + Xs2 - R1\sin B1 - Xs1}{t2 - t1} \quad (94)$$

$$Vyt = \frac{R2\cos B2 + Ys2 - R1\cos B1 - Ys1}{t2 - t1} \quad (95)$$

ii. Compute the target speed (V):

$$V = \sqrt{Vxt^2 + Vyt^2} \quad (96)$$

iii. Compute the speed residual (RESv):

$$RESv = Vc - V \quad (97)$$

where V is the assumed target speed.

iv. Compute the normalized speed residual ($\overline{RESv}$):

$$\overline{RESv} = \frac{RESv}{\sigma V} \quad (98)$$

where σV is the assumed target speed standard deviation.

e.) Compute the Endpoint coordinate performance index as the square root of the means of the squared normalized residuals.

7. Set the minimum and maximum range at t1 with respect to the sensor associated with time line 1 ($R1_{min}, R1_{max}$) and the minimum and maximum range at t2 with respect to the sensor associated with time line 2 ($R2_{min}, R2_{max}$) as follows:

a. If the measurement at time line 1 is a bearing, set the minimum range at t1 with respect to the sensor associated with time line 1 ($R1_{min}$) to the minimum range constraint which is defaulted to 100.

b. If the measurement at time line 1 is a conical angle, compute the minimum range at t1 with respect to the sensor associated with time line 1 ($R1_{min}$). If $R1_{min}$ is less than the minimum range constraint, set $R1_{min}$ to the minimum range constraint which is defaulted to 100. The minimum range with respect to the sensor is computed as described in equations (4) thru (8).

c. Set the maximum range at t1 with respect to the sensor associated with time line 1 ($R1_{max}$) to the maximum range constraint with is defaulted to 200000.

d. If the measurement at time line 2 is a bearing, set the minimum range at t2 with respect to the sensor associated with time line 2 ($R2_{min}$) to the minimum range constraint which is defaulted to 100.

e. If the measurement at time line 2 is a conical angle, compute the minimum range at t2 with respect to the sensor associated with time line 2 ($R2_{min}$). If $R2_{min}$ is less than the minimum range constraint, set $R2_{min}$ to the minimum range constraint which is defaulted to 100. The minimum range with respect to the sensor is computed as described in equations (4) thru (8).

f. Set the maximum range at t2 with respect to the sensor associated with time line 2 ($R2_{max}$) to the maximum range constraint which is defaulted to 200000.

8. Compute the endpoint parameters as follows:
   a. If the measurement at time line 1 is a bearing, set true bearing at t1 with respect to the sensor associated with time line 1 (B1) to the smoothed bearing estimate at time line 1 output by the endpoint smoother algorithm.

b. If the measurement at time line 1 is a conical angle,
      i. Compute the target image depth at t1 with respect to the sensor associated with time line 1 (Rz1) as described for equations (4) and (5).

ii. Compute the maximum depression/elevation (D/E) angle at t1 with respect to the sensor associated with time line 1 ($\theta 1_{max}$) as described for equations (6) thru (8).

iii. Compute the slant range at t1 with respect to the sensor associated with time line 1 (Rs1):

$$Rs1 = \sqrt{R1^2 + Rz1^2} \quad (99)$$

iv. Compute the D/E angle t1 with respect to the sensor associated with time line 1 ($\theta 1$):

$$\theta 1 = \sin^{-1}\left(\frac{Rz1}{Rs1}\right) \qquad (100)$$

v. If $\theta > \theta 1_{max}$, the D/E angle is invalid and processing shall terminate.

vi. Compute the cosine of relative bearing at t1 with respect to the sensor associated with time line 1 (cBr1) as follows:

$$cBr1 = \frac{\cos\beta 1 + \sin Cs1 \sin\theta 1}{\cos Cs1 \cos\theta 1} \qquad (101)$$

where Cs1 is the cant angle at t1 of the sensor associated with time line 1

$\beta 1$ is the smoothed conical angle estimate at time line 1 output by the endpoint smoother algorithm.

vii. Insure that $-0.99999 < cBr1 < 0.99999$.

viii. Compute the relative bearing at t1 with respect to the sensor associated with time line 1 (Br1) as follows:

$$Br1 = \cos^{-1} cBr1 \qquad (102)$$

ix. If the port/starboard assumption for time line 1 indicates port, set $Br1 = 2\pi - Br1$.

x. Compute the true bearing at t1 with respect to the sensor associated with time line 1 (B1) as follows:

$$B1 = Br1 + Hs1 \qquad (103)$$

where Hs1 is the heading at t1 of the sensor associated with time line 1 c. If the measurement at time line 2 is a bearing, set true bearing at t2 with respect to the sensor associated with time line 2 (B2) to the smoothed bearing estimate at time line 2 output by the endpoint smoother algorithm.

d. If the measurement at time line 2 is a conical angle, i. Compute the target image depth at t2 with respect to the sensor associated with time line 2 (Rz2) as described for equations (4) and (5).

ii. Compute the maximum D/E angle at t2 with respect to the sensor associated with time line 2 ($\theta 2_{max}$) as described for equations (6) thru (8).

iii. Compute the slant range at t2 with respect to the sensor associated with time line 2 (Rs2):

$$Rs2 = \sqrt{R2^2 + Rz2^2} \qquad (104)$$

iv. Compute the D/E angle at t2 with respect to the sensor associated with time line 2 ($\theta_2$):

$$\theta 2 = \sin^{-1}\left(\frac{Rz2}{Rs2}\right) \qquad (105)$$

v. If $\theta 2 > \theta 2_{max}$, the D/E angle is invalid and processing shall terminate.

vi. Compute the cosine of relative bearing at t2 with respect to the sensor associated with time line 2 (cBr2) as follows:

$$cBr2 = \frac{\cos\beta 2 + \sin Cs2 \sin\theta 2}{\cos Cs2 \cos\theta 2} \qquad (106)$$

where Cs2 is the cant angle at t2 of the sensor associated with time line 2.

$\beta 2$ is the smoothed conical angle estimate at time line 2 output by the endpoint smoother algorithm.

vii. Insure that $-0.99999 < cBr2 < 0.99999$.

viii. Compute the relative bearing at t2 with respect to the sensor associated with time line 2 (Br2) as follows:

$$Br2 = \cos^{-1} cBr2 \qquad (107)$$

ix. If the port/starboard assumption for time line 2 indicates port, set $Br2 = 2\pi - Br2$.

x. Compute the true bearing at t2 with respect to the sensor associated with time line 2 (B2) as follows:

$$B2 = Br2 + Hs2 \qquad (108)$$

where Hs2 is the heading at t2 of the sensor associated with time line 2.

9. Compute the initial x-component of target velocity (Vxt) and initial y-component of target velocity (Vyt):

$$Vxt = \frac{R2\sin B2 + Xs2 - R1\sin B1 - Xs1}{t2 - t1} \qquad (109)$$

$$Vyt = \frac{R2\cos B2 + Ys2 - R1\cos B1 - Ys1}{t2 - t1} \qquad (110)$$

where Xs2 is the x-coordinate of the position at t2 of the sensor associated with time line 2

Ys2 is the y-coordinate of the position at t2 of the sensor associated with time line 2

Xs1 is the x-coordinate of the position at t1 of the sensor associated with time line 1

Ys1 is the y-coordinate of the position at t1 of the sensor associated with time line 1

10. Compute the initial target course (Ct) and speed (Vt) estimates:

$$Ct = \tan^{-1}\left(\frac{Vxt}{Vyt}\right) \qquad (111)$$

$$Vt = \sqrt{Vxt^2 + Vyt^2} \qquad (112)$$

11. Compute initial x-coordinate of target position at tc (Xtc) and initial y-coordinate of target position at tc (Ytc):

$$Xtc = R2 \sin B2 + Xs2 + Vxt(t2-tc) \qquad (113)$$

$$Ytc = R2 \cos B2 + Ys2 + Vyt(t2-tc) \qquad (114)$$

where tc is current time

12. Compute initial x-component of range at tc with respect to own ship (Rxoc) and initial y-component of range at tc with respect to own ship (Ryoc):

$$Rxoc = Xtc - Xoc \qquad (115)$$

$$Ryoc = Ytc - Yoc \qquad (116)$$

where Xoc is the x-coordinate of own ship position at tc

Yoc is the y-coordinate of own ship position at tc

13. Compute initial range at tc with respect to own ship (Roc) and true bearing at tc with respect to own ship (Boc):

$$Roc = \sqrt{Rxoc^2 + Ryoc^2} \qquad (117)$$

$$Boc = \tan^{-1}\left(\frac{Rxoc}{Ryoc}\right) \tag{118}$$

14. If a range constraint is being imposed, limit the initial range at tc with respect to own ship to the maximum target range constraint. If a speed constraint is being imposed, limit the initial target speed estimate (Vt) to the maximum target speed constraint.

15. Gauss-Newton iterations shall be performed as described in paragraphs a through r below, until the algorithm converges as described in paragraph r or until twenty-five iterations have been performed.
    a. If the measurement at time line 1 is a conical angle, compute endpoint parameters at the time of the measurement at time line 1:
        i. Limit the range at t1 with respect to the sensor associated with time line 1 (R1) to a minimum of $R1_{min}+0.1$.
        ii. Compute the target image depth at t1 with respect to the sensor associated with time line (Rz1) as described for equations (4) and (5).
        iii. Compute the maximum depression/elevation (D/E) angle at t1 with respect to the sensor associated with time line 1 ($\theta 1_{max}$) as described for equations (6) thru (8).
        iv. Compute the slant range at t1 with respect to the sensor associated with time line 1 (Rs1):

$$Rs1 = \sqrt{R1^2 + Rz1^2} \tag{119}$$

v. Compute the D/E angle at t1 with respect to the sensor associated with time line 1 ($\theta 1$):

$$\theta 1 = \sin^{-1}\left(\frac{Rz1}{Rs1}\right) \tag{120}$$

vi. If $\theta 1 < \theta 1_{max}$, perform the following:
            1.) Compute the cosine of relative bearing at t1 with respect to the sensor associated with time line 1 (cBr1) as follows:

$$cBr1 = \frac{\cos\beta 1 + \sin Cs1 \sin\theta 1}{\cos Cs1 \cos\theta 1} \tag{121}$$

2.) Insure that $-0.99999 < cBr1 < 0.99999$.
            3.) Compute the relative bearing at t1 with respect to the sensor associated with time line (Br1) as follows:

$$Br1 = \cos^{-1} cBr1 \tag{122}$$

4.) If the port/starboard assumption for time line 1 indicates port, set $Br1 = 2\pi - Br1$.
            5.) Compute the true bearing at t1 with respect to the sensor associated with time line 1 (B1) as follows:

$$B1 = Br1 + Hs1 \tag{123}$$

6.) Compute the slant range at t1 respect to the sensor associated with time line 1 (Rs1) as follows:

$$Rs1 = \sqrt{R1^2 + Rz1^2} \tag{124}$$

vii. If $\theta 1 > \theta 1_{max}$, terminate all processing.

b. If the measurement at time line 2 is a conical angle, compute endpoint parameters at the time of the measurement at time line 2:
        i. Limit the range at t2 with respect to the sensor associated with time line 2 (R2) to a minimum of $R2_{min}+0.1$.
        ii. Compute the target image depth at t2 with respect to the sensor associated with time line 2 (Rz2) as described for equations (4) and (5).
        iii. Compute the maximum D/E angle at t2 with respect to the sensor associated with time line 2 ($\theta 2_{max}$) as described for equations (6) thru (8).
        iv. Compute the slant range at t2 with respect to the sensor associated with time line 2 (Rs2):

$$Rs2 = \sqrt{R2^2 + Rz2^2} \tag{125}$$

v. Compute the D/E angle at t2 with respect to the sensor associated with time line 2 ($\theta 2$):

$$\theta 2 = \sin^{-1}\left(\frac{Rz2}{Rs2}\right) \tag{126}$$

vi. If $\theta 2 < \theta 2_{max}$, perform the following:
            1.) Compute the cosine of relative bearing at t2 with respect to the sensor associated with time line 2 (cBr2) as follows:

$$cBr2 = \frac{\cos\beta 2 + \sin Cs2 \sin\theta 2}{\cos Cs2 \cos\theta 2} \tag{127}$$

2.) Insure that $-0.99999 < cBr2 < 0.99999$.
            3.) Compute the relative bearing at t2 with respect to the sensor associated with time line 2 (Br2) as follows:

$$Br2 = \cos^{-1} cBr2 \tag{128}$$

4.) If the port/starboard assumption for time line 2 indicates port, set $Br2 = 2\pi - Br2$.
            5.) Compute the true bearing at t2 with respect to the sensor associated with time line 2 (B2) as follows:

$$B2 = Br2 + Hs2 \tag{129}$$

6.) Compute the slant range at t2 respect to the sensor associated with time line 2 (Rs2) as follows:

$$Rs2 = \sqrt{R2^2 + Rz2^2} \tag{130}$$

vii. If $\theta 2 > \theta 2_{max}$, terminate all processing.

c. For each measurement in the batch:
        i. Compute the x-component of range at $t_i$ with respect to the sensor associated with the ith measurement ($Rx_i$) and the y-component of range at $t_i$ with respect to the sensor associated with the ith measurement ($Ry_i$):

$$T1_i = \frac{t_i - t1}{t2 - t1} \tag{131}$$

$$T2_i = 1 - T1_i \tag{132}$$

$$Rx_i = T2_i R1 \sin B1 + T1_i R2 \sin B2 + T1_i(Xs2 - Xs1) - (Xs_i - Xs1) \tag{133}$$

$$Ry_i = T2_i R1 \cos B1 + T1_i R2 \cos B2 + T1_i(Ys2 - Ys1) - (Ys_i - Ys1) \tag{134}$$

where $Xs_i$ is the x-coordinate of the position at $t_i$ of the sensor associated with the ith measurement $Ys_i$ is the y-coordinate of the position at $t_i$ of the sensor associated with the ith measurement $t_i$ is the time of the ith measurement ii. Compute the range at $t_i$ with respect to the sensor associated with the ith measurement ($R_i$) and bearing at $t_i$ with respect to the sensor associated with the ith measurement ($B_i$):

$$R_i = \sqrt{Rx_i^2 + Ry_i^2} \tag{135}$$

$$B_i = \tan^{-1}\left(\frac{Rx_i}{Ry_i}\right) \tag{136}$$

iii. Compute the target image depth at $t_i$ with respect to the sensor associated with the ith measurement ($Rz_i$) and D/E angle at $t_i$ with respect to the sensor associated with the ith measurement ($\theta_i$) as described for equations (75) and (76).

iv. If the measurement at time line 1 is a bearing, the following shall be performed:

1.) Compute the partial derivative of the x-component of target range at $t_i$ with respect to the sensor associated with the ith measurement with respect to range at t1 with respect to the sensor associated with time line 1

$$\left(\frac{\partial Rx_i}{\partial R1}\right)$$

and the partial derivative of the y-component of target range at $t_i$ with respect to range at t1 with respect to the sensor associated with line 1

$$\left(\frac{\partial Ry_i}{\partial R1}\right):$$

$$\frac{\partial Rx_i}{\partial R1} = T2_i \sin B1 \tag{137}$$

$$\frac{\partial Ry_i}{\partial R1} = T2_i \cos B1 \tag{138}$$

2.) Compute the partial derivative of target horizontal range at $t_i$ with respect to the sensor associated with the ith measurement with respect to range at t1 with respect to the sensor associated with time line 1

$$\left(\frac{\partial R_i}{\partial R1}\right):$$

$$\frac{\partial R_i}{\partial R1} = \frac{Rx_i \frac{\partial Rx_i}{\partial R1} + Ry_i \frac{\partial Ry_i}{\partial R1}}{R_i} \tag{139}$$

3.) Compute the partial derivative of the bearing at $t_i$ with respect to the sensor associated with the ith measurement with respect to range at t1 with respect to the sensor associated with time line 1

$$\left(\frac{\partial B_i}{\partial R1}\right):$$

$$\frac{\partial B_i}{\partial R1} = \frac{T2_i \sin(B1 - B_i)}{R_i} \tag{140}$$

4.) Compute the partial derivative of the sine of true bearing at t1 with respect to the sensor associated with time line 1 with respect to range at t1 with respect to the sensor associated with time line 1

$$\left(\frac{\partial sB1}{\partial R1}\right)$$

and the partial derivative of the cosine of true bearing at t1 with respect to the sensor associated with time line 1 with respect to range at t1 with respect to the sensor associated with time line 1

$$\left(\frac{\partial cB1}{\partial R1}\right):$$

$$\frac{\partial sB1}{\partial R1} = 0 \tag{141}$$

$$\frac{\partial cB1}{\partial R1} = 0 \tag{142}$$

v. If the measurement at time line 1 is a conical angle, the following shall be performed:

1.) Compute the partial derivative of the sine of true bearing at t1 with respect to the sensor associated with time line 1 with respect to range at t1 with respect to the sensor associated with time line 1

$$\left(\frac{\partial sB1}{\partial R1}\right)$$

and the partial derivative of the cosine of true bearing at t1 with respect to the sensor associated with time line 1 with respect to range at t1 with respect to the sensor associated with time line 1

$$\left(\frac{\partial cB1}{\partial R1}\right):$$

$$TMP1 = \frac{-Rz1}{R1^2 \cos Cs1\left(\frac{Rz1\cos\beta1}{Rs1} + \sin Cs1\right)} \tag{143}$$

$$TMP2 = -\left(\frac{\cos Br1}{\sin Br1}\right)TMP1 \tag{144}$$

$$\frac{\partial cB1}{\partial R1} = TMP1 \cos Hs1 - TMP\sin Hs1 \tag{145}$$

$$\frac{\partial sB1}{\partial R1} = -\left(\frac{\cos B1}{\sin B1}\right)\frac{\partial cB1}{\partial R1} \tag{146}$$

2.) Compute the partial derivative of the x-component of range at $t_i$ with respect to the sensor associated with the ith measurement with respect to range at t1 with respect to the sensor associated with time line 1

$$\left(\frac{\partial Rx_i}{\partial R1}\right)$$

and the partial derivative of the y-component of range at $t_i$ with respect to the sensor associated with the ith measurement with respect to range at t1 with respect to the sensor associated with time line 1

$$\left(\frac{\partial Ry_i}{\partial R1}\right):$$

$$\frac{\partial Rx_i}{\partial R1} = T2_i\left(R1\frac{\partial sB1}{\partial R1} + \sin B1\right) \quad (147)$$

$$\frac{\partial Ry_i}{\partial R1} = T2_i\left(R1\frac{\partial cB1}{\partial R1} + \cos B1\right) \quad (148)$$

3.) Compute the partial derivative of horizontal range at $t_i$ with respect to the sensor associated with the ith measurement with respect to the range at t1 with respect to the sensor associated with time line 1

$$\left(\frac{\partial R_i}{\partial R1}\right):$$

$$\frac{\partial R_i}{\partial R1} = \frac{Rx_i\frac{\partial Rx_i}{\partial R1} + Ry_i\frac{\partial Ry_i}{\partial R1}}{R_i} \quad (147)$$

4.) Compute the partial derivative of true bearing at $t_i$ with respect to the sensor associated with the ith measurement with respect to range at t1 with respect to the sensor associated with time line 1

$$\left(\frac{\partial B_i}{\partial R1}\right):$$

$$\frac{\partial B_i}{\partial R1} = \frac{Ry_i\frac{\partial Rx_i}{\partial R1} - Rx_i\frac{\partial Ry_i}{\partial R1}}{R_i^2} \quad (150)$$

vi. If the measurement at time line 2 is a bearing, the following shall be performed:
 1.) Compute the partial derivative of the x-component of target range at $t_i$ with respect to the sensor associated with the ith measurement with respect to range at t2 with respect to the sensor associated with time line 2

$$\left(\frac{\partial Rx_i}{\partial R2}\right)$$

and the partial derivative of the y-component of target range at $t_i$ with respect to the sensor associated with the ith measurement with respect to range at t2 with respect to the sensor associated with time line 2

$$\left(\frac{\partial Ry_i}{\partial R2}\right):$$

$$\frac{\partial Rx_i}{\partial R2} = T1_i\sin B2 \quad (151)$$

$$\frac{\partial Ry_i}{\partial R2} = T1_i\cos B2 \quad (152)$$

2.) Compute the partial derivative of target horizontal range at $t_i$ with respect to the sensor associated with the ith measurement with respect to range at t2 with respect to the sensor associated with time line 2

$$\left(\frac{\partial R_i}{\partial R2}\right):$$

$$\frac{\partial R_i}{\partial R2} = \frac{Rx_i\frac{\partial Rx_i}{\partial R2} + Ry_i\frac{\partial Ry_i}{\partial R2}}{R_i} \quad (153)$$

3.) Compute the partial derivative of the bearing at $t_i$ with respect to the sensor associated with the ith measurement with respect to range at t2 with respect to the sensor associated with time line 2

$$\left(\frac{\partial B_i}{\partial R2}\right):$$

$$\frac{\partial B_i}{\partial R2} = \frac{T1_i\sin(B2 - B_i)}{R_i} \quad (154)$$

4.) Compute the partial derivative of the sine of true bearing at t2 with respect to the sensor associated with time line 2 with respect to range at t2 with respect to the sensor associated with time line 2

$$\left(\frac{\partial sB2}{\partial R2}\right)$$

and the partial derivative of the cosine of true bearing at t2 with respect to the sensor associated with time line 2 with respect to range at t2 with respect to the sensor associated with time line 2

$$\left(\frac{\partial cB2}{\partial R2}\right):$$

$$\frac{\partial sB2}{\partial R2} = 0 \quad (155)$$

$$\frac{\partial cB2}{\partial R2} = 0 \quad (156)$$

vii. If the measurement at time line 2 is a conical angle, the following shall be performed:
 1.) Compute the partial derivative of the sine of true bearing at t2 with respect to the sensor associated with time line 2 with respect to range at t2 with respect to the sensor associated with time line 2

$$\left(\frac{\partial sB2}{\partial R2}\right)$$

and the partial derivative of the cosine of true bearing at t2 with respect to the sensor associated with time line 2 with respect to range at t2 with respect to the sensor associated with time line 2

$$\left(\frac{\partial cB2}{\partial R2}\right):$$

$$TMP1 = \frac{-Rz2}{R2^2 \cos Cs2 \left(\frac{Rz2\cos\beta2}{Rs2} + \sin Cs2\right)} \quad (157)$$

$$TMP2 = -\left(\frac{\cos Br2}{\sin Br2}\right) TMP1 \quad (158)$$

$$\frac{\partial cB2}{\partial R2} = TMP1\cos Hs2 - TMP2\sin Hs2 \quad (159)$$

$$\frac{\partial sB2}{\partial R2} = -\left(\frac{\cos B2}{\sin B2}\right)\frac{\partial cB2}{\partial R2} \quad (160)$$

2.) Compute the partial derivative of the x-component of range at $t_i$ with respect to the sensor associated with the ith measurement with respect to range at t2 with respect to the sensor associated with time line 2

$$\left(\frac{\partial Rx_i}{\partial R2}\right)$$

and the partial derivative of the y-component of range at $t_i$ with respect to the sensor associated with the ith measurement with respect to range at t2 with respect to the sensor associated with time line 2

$$\left(\frac{\partial Ry_i}{\partial R2}\right):$$

$$\frac{\partial Rx_i}{\partial R2} = T1_i\left(R2\frac{\partial sB2}{\partial R2} + \sin B2\right) \quad (161)$$

$$\frac{\partial Ry_i}{\partial R2} = T1_i\left(R2\frac{\partial cB2}{\partial R2} + \cos B2\right) \quad (162)$$

3.) Compute the partial derivative of horizontal range at $t_i$ with respect to the sensor associated with the ith measurement with respect to the range at t2 with respect to the sensor associated with time line 2

$$\left(\frac{\partial R_i}{\partial R2}\right):$$

$$\frac{\partial R_i}{\partial R2} = \frac{Rx_i\frac{\partial Rx_i}{\partial R2} + Ry_i\frac{\partial Ry_i}{\partial R2}}{R_i} \quad (163)$$

4.) Compute the partial derivative of true bearing at $t_i$ with respect to the sensor associated with the ith measurement with respect to range at t2 with respect to the sensor associated with time line 2

$$\left(\frac{\partial B_i}{\partial R2}\right):$$

$$\frac{\partial B_i}{\partial R2} = \frac{Ry_i\frac{\partial Rx_i}{\partial R2} - Rx_i\frac{\partial Ry_i}{\partial R2}}{R_i^2} \quad (164)$$

viii. If the ith measurement is a bearing, then the following shall be performed:
  1.) Compute the bearing residual ($RESb_i$) such that $-\pi \leq RESb_i \leq \pi$:

$$RESb_i = Bm_i - B_i \quad (165)$$

where $Bm_i$ is the measured bearing at $t_i$
  2.) Compute the normalized bearing residual ($\overline{RESb_i}$) and normalized partial derivatives $$\left(\overline{\frac{\partial B_i}{\partial R1}}, \overline{\frac{\partial B_i}{\partial R2}}\right):$$

$$\overline{RESb_i} = \frac{RESb_i}{\sigma b_i} \quad (166)$$

$$\overline{\frac{\partial B_i}{\partial R1}} = \frac{\frac{\partial B_i}{\partial R1}}{\sigma b_i} \quad (167)$$

$$\overline{\frac{\partial B_i}{\partial R2}} = \frac{\frac{\partial B_i}{\partial R2}}{\sigma b_i} \quad (168)$$

where $\sigma b_i$ is the standard deviation of the bearing measurement
  3.) If frequency data are not being processed, set the next row of the augmented Jacobian H Matrix as follows:

$$\left[\overline{\frac{\partial B_i}{\partial R1}} \quad \overline{\frac{\partial B_i}{\partial R2}} \quad \overline{RESb_i}\right] \quad (169)$$

If frequency data are being processed, set the next row of the augmented Jacobian H matrix as follows:

$$\left[\overline{\frac{\partial B_i}{\partial R2}} \quad \overline{\frac{\partial B_i}{\partial R2}} \quad O \quad \overline{RESb_i}\right] \quad (170)$$

ix. If the ith measurement is a conical angle and the D/E-mark indicates a valid D/E:
  1.) Compute the true bearing at $t_i$ with respect to the sensor associated with the ith measurement ($B_i$):

$$B_i = \tan^{-1}\left(\frac{Rx_i}{Ry_i}\right) \quad (171)$$

2.) Compute the slant range at $t_i$ with respect to the sensor associated with the ith measurement ($Rs_i$):

$$Rs_i = \sqrt{Rx_i^2 + Ry_i^2 + Rz_i^2} \qquad (172)$$

3.) If the measurement at time line 1 is a conical angle:
  a Compute the partial derivative of slant range at t1 with respect to the sensor associated with time line 1 with respect to range at t1 with respect to the sensor associated with time line 1

$$\left(\frac{\partial Rs1}{\partial R1}\right):$$

$$\frac{\partial Rs1}{\partial R1} = \frac{R1}{Rs1} \qquad (173)$$

b Compute the partial derivative of cosine of relative bearing at t1 with respect to the sensor associated with time line 1 with respect to range at t1 with respect to the sensor associated with time line $$\left(\frac{\partial cBr1}{\partial R1}\right)$$

and the partial derivative of sine of relative bearing at t1 with respect to the sensor associated with time line 1 with respect to range at t1 with respect to the sensor associated with time line 1

$$\left(\frac{\partial sBr1}{\partial R1}\right):$$

$$\frac{\partial cBr1}{\partial R1} = \frac{\cos\beta 1\left(R1\frac{\partial Rs1}{\partial R1} - Rs1\right) - Rz1\sin Cs1}{R1^2 \cos Cs1} \qquad (174)$$

$$\frac{\partial sBr1}{\partial R1} = -\frac{\cos Br1}{\sin Br1}\frac{\partial cBr1}{\partial R1} \qquad (175)$$

4.) If the measurement at time line 2 is a conical angle:
  a Compute the partial derivative of slant range at t2 with respect to the sensor associated with time line 2 with respect to range at t2 with respect to the sensor associated with time line 2

$$\left(\frac{\partial Rs2}{\partial R2}\right):$$

$$\frac{\partial Rs2}{\partial R2} = \frac{R2}{Rs2} \qquad (176)$$

b Compute the partial derivative of cosine of relative bearing at t2 with respect to the sensor associated with time line 2 with respect to range at t2 with respect to the sensor associated with time line 2

$$\left(\frac{\partial cBr2}{\partial R2}\right)$$

and the partial derivative of sine of relative bearing at t2 with respect to the sensor associated with time line 2 with respect to range at t2 with respect to the sensor associated with time line 2

$$\left(\frac{\partial sBr2}{\partial R2}\right):$$

$$\frac{\partial cBr2}{\partial R2} = \frac{\cos\beta r2\left(R2\frac{\partial Rs2}{\partial R2} - Rs2\right) - Rz2\sin Cs2}{R2^2 \cos Cs2} \qquad (177)$$

$$\frac{\partial sBr2}{\partial R2} = -\frac{\cos Br2}{\sin Br2}\frac{\partial cBr2}{\partial R2} \qquad (178)$$

5.) Compute the partial derivative of slant range at $t_i$ with respect to the sensor associated with the ith measurement with respect to the x-component of range at $t_i$ with respect to the sensor associated with the ith measurement $$\left(\frac{\partial Rs_i}{\partial Rx_i}\right)$$

and the partial derivative of slant range at $t_i$ with respect to the sensor associated with the ith measurement with respect to the y-component of range at $t_i$ with respect to the sensor associated with the ith measurement $$\left(\frac{\partial Rs_i}{\partial Ry_i}\right):$$

$$\frac{\partial Rs_i}{\partial Rx_i} = \frac{Rx_i}{Rs_i} \qquad (179)$$

$$\frac{\partial Rs_i}{\partial Ry_i} = \frac{Ry_i}{Rs_i} \qquad (180)$$

6.) Compute the partial derivative of relative at $t_i$ with respect to the sensor associated with the ith measurement with respect to range at t1 with respect to the sensor associated with time line 1

$$\left(\frac{\partial Br_i}{\partial R1}\right)$$

and the partial derivative of relative bearing at $t_i$ with respect to the sensor associated with the ith measurement with respect to range at t2 with respect to the sensor associated with time line 2

$\left(\dfrac{\partial Br_i}{\partial R2}\right)$:

$$\dfrac{\partial Br_i}{\partial R1} = \dfrac{Ry_i \dfrac{\partial Rx_i}{\partial R1} - Rx_i \dfrac{\partial Ry_i}{\partial R1}}{R_i^2} \tag{181}$$

$$\dfrac{\partial Br_i}{\partial R2} = \dfrac{Ry_i \dfrac{\partial Rx_i}{\partial R2} - Rx_i \dfrac{\partial Ry_i}{\partial R2}}{R_i^2} \tag{182}$$

7.) Compute the partial derivative of D/E at $t_i$ with respect to the sensor associated with the ith measurement with respect to range at t1 with respect to the sensor associated with time line 1

$\left(\dfrac{\partial \theta_i}{\partial R1}\right)$ and the partial derivative of D/E angle at $t_i$ with respect to the sensor associated with the ith measurement with respect to range at t2 with respect to the sensor associated with time line 2

$\left(\dfrac{\partial \theta_i}{\partial R2}\right)$:

$$\dfrac{\partial \theta_i}{\partial R1} = \dfrac{-Rz_i \dfrac{\partial R_i}{\partial R1}}{Rs_i^2} \tag{183}$$

$$\dfrac{\partial \theta_i}{\partial R2} = \dfrac{-Rz_i \dfrac{\partial R_i}{\partial R2}}{Rs_i^2} \tag{184}$$

8.) Compute the sine and cosine of D/E angle at $t_i$ with respect to the sensor associated with the ith measurement:

$$\sin\theta_i = \dfrac{Rz_i}{Rs_i} \tag{185}$$

$$\cos\theta_i = \dfrac{R_i}{Rs_i} \tag{186}$$

9.) Compute the relative bearing at $t_i$ with respect to the sensor associated with the ith measurement ($Br_i$):

$$Br_i = B_i - Hs_i \tag{187}$$

10.) Compute the conical angle at $t_i$ from a horizontal array with respect to the sensor associated with the ith measurement ($\beta h_i$):

$$\beta h_i = \cos^{-1}(\cos\theta_i \cos Br_i) \tag{188}$$

11.) Is $\sin \beta h_i \neq 0$, compute the partial derivative of the conical angle at $t_i$ from a horizontal array with respect to the sensor associated with the ith measurement with respect to range at t1 with respect to the sensor associated with time line 1

$\left(\dfrac{\partial \beta h_i}{\partial R1}\right)$ and the partial derivative of the conical angle at $t_i$ from a horizontal array with respect to the sensor associated with the ith measurement with respect to range at t2 with respect to the sensor associated with time line 2

$\left(\dfrac{\partial \beta h_i}{\partial R2}\right)$:

$$\dfrac{\partial \beta h_i}{\partial R1} = \dfrac{\cos Br_i \sin\theta_i \dfrac{\partial \theta_i}{\partial R1} + \sin Br_i \cos\theta_i \dfrac{\partial Br_i}{\partial R1}}{\sin\beta h_i} \tag{189}$$

$$\dfrac{\partial \beta h_i}{\partial R2} = \dfrac{\cos Br_i \sin\theta_i \dfrac{\partial \theta_i}{\partial R2} + \sin Br_i \cos\theta_i \dfrac{\partial Br_i}{\partial R2}}{\sin\beta h_i} \tag{190}$$

12.) Compute the x-component of range at $t_i$ with respect to the sensor associated with the ith measurement at the time of the ith measurement ($xta_i$), the y-component of range at $t_i$ with respect to the sensor associated with the ith measurement at the time of the ith measurement ($yta_i$) and the z-component of range at $t_i$ with respect to the sensor associated with the ith measurement at the time of the ith measurement ($zta_i$) rotated to the axis of the array:

$$xta_i = Rx_i \cos Hs_i - Ry_i \sin Hs_i \tag{191}$$

$$yta_i = (Rx_i \sin Hs_i + Ry_i \cos Hs_i)\cos Cs_i - Rz_i \sin Cs_i \tag{192}$$

$$zta_i = (Rx_i \sin Hs_i + Ry_i \cos Hs_i)\sin Cs_i - Rz_i \cos Cs_i \tag{193}$$

13.) Compute the conical angle at $t_i$ with respect to the sensor associated with the ith measurement ($\beta_i$):

If $yta_i \neq 0$, $$\beta_i = \tan^{-1}\left(\dfrac{\sqrt{xta_i^2 + zta_i^2}}{yta_i}\right) \tag{194}$$

otherwise, $$\beta_i = \dfrac{\pi}{2} \tag{195}$$

14.) If $\sin\beta_i \neq 0$, compute the partial derivative of the conical angle at $t_i$ with respect to the sensor associated with the ith measurement with respect to range at t1 with respect to the sensor associated with time line 1

$\left(\dfrac{\partial \beta_i}{\partial R1}\right)$ and the partial derivative of the conical angle at $t_i$ with respect to range at t2 with respect to the sensor associated with time line 2

$$\left(\frac{\partial \beta_i}{\partial R2}\right):$$

$$\frac{\partial \beta_i}{\partial R1} = \frac{\cos Cs_i \sin\beta h_i \frac{\partial \beta h_i}{\partial R1} + \sin Cs_i \cos\theta_i \frac{\partial \theta_i}{\partial R1}}{\sin\beta_i} \quad (196)$$

$$\frac{\partial \beta_i}{\partial R2} = \frac{\cos Cs_i \sin\beta h_i \frac{\partial \beta h_i}{\partial R2} + \sin Cs_i \cos\theta_i \frac{\partial \theta_i}{\partial R2}}{\sin\beta_i} \quad (197)$$

15.) Compute the conical angle residual ($RES\beta_i$) such that $-\pi \leq RES\beta_i \leq \pi$:

$$RES\beta_i = \beta m_i - \beta_i \quad (198)$$

where $\beta m_i$ is the measured conical angle at $t_i$.

16.) Compute the normalized conical angle residual ($\overline{RES\beta_i}$) and normalized partial derivatives $$\left(\overline{\frac{\partial \beta_i}{\partial R1}}, \overline{\frac{\partial \beta_i}{\partial R2}}\right):$$

$$\overline{RES\beta}_i = \frac{RES\beta_i}{\sigma\beta_i} \quad (199)$$

$$\overline{\frac{\partial \beta_i}{\partial R1}} = \frac{\frac{\partial \beta_i}{\partial R1}}{\sigma\beta_i} \quad (200)$$

$$\overline{\frac{\partial \beta_i}{\partial R2}} = \frac{\frac{\partial \beta_i}{\partial R2}}{\sigma\beta_i} \quad (201)$$

where $\sigma\beta_i$ is the standard deviation of the conical angle measurement.

17.) If frequency data are not being processed, set the next row of the augmented Jacobian H matrix to:

$$\left[\overline{\frac{\partial \beta_i}{\partial R1}} \ \overline{\frac{\partial \beta_i}{\partial R2}} \ \overline{RES\beta_i}\right] \quad (202)$$

If frequency data are being processed, set the next row of the augmented Jacobian H matrix to:

$$\left[\overline{\frac{\partial \beta_i}{\partial R1}} \ \overline{\frac{\partial \beta_i}{\partial R2}} \ 0 \ \overline{RES\beta_i}\right] \quad (203)$$

x. If the ith measurement is a horizontal range:

1.) Compute the range residual ($RESr_i$):

$$RESr_i = Rm_i - R_i \quad (204)$$

where $Rm_i$ is the measured horizontal range at $t_i$.

2.) Compute the normalized range residual ($\overline{RESr_i}$) and normalized partial derivatives $$\left(\overline{\frac{\partial R_i}{\partial R1}}, \overline{\frac{\partial R_i}{\partial R2}}\right):$$

$$\overline{RESr}_i = \frac{RESr_i}{\sigma r_i} \quad (205)$$

$$\overline{\frac{\partial R_i}{\partial R1}} = \frac{\frac{\partial R_i}{\partial R1}}{\sigma r_i} \quad (206)$$

$$\overline{\frac{\partial R_i}{\partial R2}} = \frac{\frac{\partial R_i}{\partial R2}}{\sigma r_i} \quad (207)$$

where $\sigma r_i$ is the standard deviation of the range measurement.

3.) If frequency data are not being processed, set the next row of the augmented Jacobian H matrix to:

$$\left[\overline{\frac{\partial R_i}{\partial R1}} \ \overline{\frac{\partial R_i}{\partial R2}} \ \overline{RESr_i}\right] \quad (208)$$

If frequency data are being processed, set the next row of the augmented Jacobian H matrix to:

$$\left[\overline{\frac{\partial R_i}{\partial R1}} \ \overline{\frac{\partial R_i}{\partial R2}} \ 0 \ \overline{RESr_i}\right] \quad (209)$$

xi. If frequency data are being processed and the D/E mark associated with the ith measurement indicates a valid D/E, then the following shall be performed:

1.) Compute the x-component of target velocity (Vxt) and the y-component of target velocity (Vyt):

$$Vxt = \frac{R2\sin B2 + Xs2 - R1\sin B1 - Xs1}{t2 - t1} \quad (210)$$

$$Vyt = \frac{R2\cos B2 + Ys2 - R1\cos B1 - Ys1}{t2 - t1} \quad (211)$$

2.) Compute the x-component of target velocity at $t_i$ relative to the sensor associated with the ith measurement ($Vx_i$) and the y-component of target velocity at $t_i$ relative to the sensor associated with the ith measurement ($Vy_i$)

$$Vx_i = Vxt - Vxs_i \quad (212)$$

$$Vy_i = Vyt - Vys_i \quad (213)$$

where $Vxs_i$ is the x-component of velocity of the sensor associated with the ith measurement $Vys_i$ is the y-component of velocity of the sensor associated with the ith measurement 3.) Compute the slant range at $t_i$ with respect to the sensor associated with the ith measurement ($Rs_i$)

$$Rs_i\sqrt{R_i^2 + Rz_i^2} \qquad (214)$$

4.) Compute the partial derivative of frequency at $t_i$ with respect to the sensor associated with the ith measurement with respect to the x-component of range at $t_i$ with respect to the sensor associated with the ith measurement $$\left(\frac{\partial f_i}{\partial Rx_i}\right)$$

and the partial derivative of frequency at $t_i$ with respect to the sensor associated with the ith measurement with respect to the y-component of range at $t_i$ with respect to the sensor associated with the ith measurement $$\left(\frac{\partial f_i}{\partial Ry_i}\right):$$

$$\frac{\partial f_i}{\partial Rx_i} = \frac{Fb}{(cRs_i + Vxs_iRx_i + Vys_iRy_i + Rx_iVx_i + Ry_iVy_i)^2} \cdot \qquad (215)$$
$$\left((Rx_iVx_i + Ry_iVy_i)\left(\frac{c}{Rs_i}Rx_i + Vxs_i\right) - \right.$$
$$\left. (cRs_i + Vxs_iRx_i + Vys_iRy_i)Vx_i\right)$$

$$\frac{\partial f_i}{\partial Ry_i} = \frac{Fb}{(cRs_i + Vxs_iRx_i + Vys_iRy_i + Rx_iVx_i + Ry_iVy_i)^2} \cdot \qquad (216)$$
$$\left((Rx_iVx_i + Ry_iVy_i)\left(\frac{c}{Rs_i}Ry_i + Vys_i\right) - \right.$$
$$\left. (cRs_i + Vxs_iRx_i + Vys_iRy_i)Vy_i\right)$$

5.) Compute the partial derivative of frequency at $t_i$ with respect to the sensor associated with the ith measurement with respect to the x-component of target relative velocity at $t_i$ with respect to the sensor associated with the ith measurement $$\left(\frac{\partial f_i}{\partial Vx_i}\right)$$

and the partial derivative of frequency at $t_i$ with respect to the sensor associated with the ith measurement with respect to the y-component of target relative velocity at $t_i$ with respect to the sensor associated with the ith measurement $$\left(\frac{\partial f_i}{\partial Vy_i}\right):$$

$$\frac{\partial f_i}{\partial Vx_i} = \frac{Fb}{(cRs_i + Vxs_iRx_i + Vys_iRy_i + Rx_iVx_i + Ry_iVy_i)^2} \cdot \qquad (217)$$
$$((cRs_i + Vxs_iRx_i + Vys_iRy_i)Rx_i)$$

-continued $$\frac{\partial f_i}{\partial Vy_i} = \frac{Fb}{(cRs_i + Vxs_iRx_i + Vys_iRy_i + Rx_iVx_i + Ry_iVy_i)^2} \cdot \qquad (218)$$
$$((cRs_i + Vxs_iRx_i + Vys_iRy_i)Ry_i)$$

6.) Compute the partial derivative of the x-component of target relative velocity at $t_i$ with respect to the sensor associated with the ith measurement with respect to range at t1 with respect to the sensor associated with the measurement at time line 1

$$\left(\frac{\partial Vx_i}{\partial R1}\right)$$

and the partial derivative of the y-component of target relative velocity at $t_i$ with respect to the sensor associated with the ith measurement with respect to range at t1 with respect to the sensor associated with time line 1

$$\left(\frac{\partial Vy_i}{\partial R1}\right):$$

$$\frac{\partial Vx_i}{\partial R1} = \frac{R1\frac{\partial \sin B1}{\partial R1} + \sin B1}{t2 - t1} \qquad (219)$$

$$\frac{\partial Vy_i}{\partial R1} = \frac{R1\frac{\partial \cos B1}{\partial R1} + \cos B1}{t2 - t1} \qquad (220)$$

7.) Compute the partial derivative of the x-component of target relative velocity at $t_i$ with respect to the sensor associated with the ith measurement with respect to range at t2 with respect to the sensor associated with time line 2 at t2

$$\left(\frac{\partial Vx_i}{\partial R2}\right)$$

and the partial derivative of the y-component of target relative velocity at $t_i$ with respect to the sensor associated with the ith measurement with respect to range at t2 with respect to the sensor associated with time line 2

$$\left(\frac{\partial Vy_i}{\partial R2}\right):$$

$$\frac{\partial Vx_i}{\partial R2} = -\frac{R2\frac{\partial sB2}{\partial R2} + \sin B2}{t2 - t1} \qquad (221)$$

$$\frac{\partial Vy_i}{\partial R2} = -\frac{R2\frac{\partial cB2}{\partial R2} + \cos B2}{t2 - t1} \qquad (222)$$

8.) Compute the partial derivative of frequency at $t_i$ with respect to the sensor associated with the ith measurement with respect to range at t1 with respect to the sensor associated with time line 1

$\left(\dfrac{\partial f_i}{\partial R1}\right)$, the partial derivative of frequency at $t_i$ with respect to the sensor associated with the ith measurement with respect to range at t2 with respect to the sensor associated with time line 2

$\left(\dfrac{\partial f_i}{\partial R2}\right)$ and the partial derivative of frequency at $t_i$ with respect to the sensor associated with the ith measurement with respect to base frequency $\left(\dfrac{\partial f_i}{\partial Fb}\right)$:

$$\dfrac{\partial f_i}{\partial R1} = \dfrac{\partial f_i}{\partial Rx_i}\dfrac{\partial Rx_i}{\partial R1} + \dfrac{\partial f_i}{\partial Ry_i}\dfrac{\partial Ry_i}{\partial R1} + \dfrac{\partial f_i}{\partial Vx_i}\dfrac{\partial Vx_i}{\partial R1} + \dfrac{\partial f_i}{\partial Vy_i}\dfrac{\partial Vy_i}{\partial R1} \quad (223)$$

$$\dfrac{\partial f_i}{\partial R2} = \dfrac{\partial f_i}{\partial Rx_i}\dfrac{\partial Rx_i}{\partial R2} + \dfrac{\partial f_i}{\partial Ry_i}\dfrac{\partial Ry_i}{\partial R2} + \dfrac{\partial f_i}{\partial Vx_i}\dfrac{\partial Vx_i}{\partial R2} + \dfrac{\partial f_i}{\partial Vy_i}\dfrac{\partial Vy_i}{\partial R2} \quad (224)$$

$$\dfrac{\partial f_i}{\partial Fb} = \dfrac{cRs_i + Vxs_iRx_i + Vys_iRy_i}{(cRs_i + Vxs_iRx_i + Vys_iRy_i + Rx_iVx_i + Ry_iVy_i)} \quad (225)$$

9.) Compute the estimated frequency at $t_i$ with respect to the sensor associated with the ith measurement at the time of the ith measurement:

$$f_i = Fb\dfrac{cRs_i + Vxs_iRx_i + Vys_iRy_i}{cRs_i + VxtRx_i + VytRy_i} \quad (226)$$

10.) Compute the frequency residual (RESf$_i$):

$$RESf_i = fm_i - f_i \quad (227)$$

where $fm_i$ is the measured frequency at $t_i$.

11.) Compute the normalized frequency residual ($\overline{RESf_i}$) and normalized partial derivatives $\left(\overline{\dfrac{\partial f_i}{\partial R1}}, \overline{\dfrac{\partial f_i}{\partial R2}}, \overline{\dfrac{\partial f_i}{\partial Fb}}\right)$:

$$\overline{RESf_i} = \dfrac{RESf_i}{\sigma f_i} \quad (228)$$

$$\overline{\dfrac{\partial f_i}{\partial R1}} = \dfrac{\dfrac{\partial f_i}{\partial R1}}{\sigma f_i} \quad (229)$$

$$\overline{\dfrac{\partial f_i}{\partial R2}} = \dfrac{\dfrac{\partial f_i}{\partial R2}}{\sigma f_i} \quad (230)$$

$$\overline{\dfrac{\partial f_i}{\partial Fb}} = \dfrac{\dfrac{\partial f_i}{\partial Fb}}{\sigma f_i} \quad (231)$$

where $\sigma f_i$ is the standard deviation of the frequency measurement.

12.) Set the next row of the augmented Jacobian H matrix to:

$$\left[\overline{\dfrac{\partial f_i}{\partial R1}}\;\overline{\dfrac{\partial f_i}{\partial R2}}\;\overline{\dfrac{\partial f_i}{\partial Fb}}\overline{RESf_i}\right] \quad (232)$$

d. If a range constraint is being imposed, then the following processing shall be performed:

i. Compute the range residual (RESR):

$$RESR = Rc - R \quad (233)$$

where Rc is the assumed target range.

ii. Compute the normalized range residual ($\overline{RESR}$):

$$\overline{RESR} = \dfrac{RESR}{\sigma R} \quad (234)$$

where $\sigma R$ is the assumed target range standard deviation.

iii. If frequency data are not being processed, set the next row of the augmented Jacobian H Matrix to:

$$\left[\overline{\dfrac{\partial R}{\partial R1}}\;\overline{\dfrac{\partial R}{\partial R2}}\overline{RESR}\right] \quad (235)$$

If frequency data are being processed, set the next row of the augmented Jacobian H matrix to:

$$\left[\overline{\dfrac{\partial R}{\partial R1}}\;\overline{\dfrac{\partial R}{\partial R2}}\;0\;\overline{RESR}\right] \quad (236)$$

e. If a speed constraint is being imposed, then the following processing shall be performed:

i. Compute the x-component of target velocity (Vxt) and the y-component of target velocity (Vyt):

$$Vxt = \dfrac{R2\sin B2 + Xs2 - R1\sin B1 - Xs1}{t2 - t1} \quad (237)$$

$$Vyt = \dfrac{R2\cos B2 + Ys2 - R1\cos B1 - Ys1}{t2 - t1} \quad (238)$$

ii. Compute the partial derivative of the x-component of target velocity with respect to range at t1 with respect to the sensor associated with the measurement at time line 1

$\left(\dfrac{\partial Vxt}{\partial R1}\right)$ and the partial derivative of the y-component of target velocity with respect to range t1 with respect to the sensor associated with time line 1

$\left(\dfrac{\partial Vyt}{\partial R1}\right)$:

$$\dfrac{\partial Vxt}{\partial R1} = -\dfrac{R1\dfrac{\partial sB1}{\partial R1} + \sin B1}{t2 - t1} \quad (239)$$

$$\dfrac{\partial Vxt}{\partial R1} = -\dfrac{R1\dfrac{\partial sB1}{\partial R1} + \cos B1}{t2 - t1} \quad (240)$$

iii. Compute the partial derivative of the x-component of target velocity with respect to range at t2 with respect to the sensor associated with time line 2

$\left(\dfrac{\partial Vxt}{\partial R2}\right)$ and the partial derivative of the y-component of target velocity with respect to range at t2 with respect to the sensor associated with time line 2

$\left(\dfrac{\partial Vyt}{\partial R2}\right)$:

$$\dfrac{\partial Vxt}{\partial R2} = -\dfrac{R2\dfrac{\partial sB}{\partial R2} + \sin B2}{t2 - t1} \quad (241)$$

$$\dfrac{\partial Vyt}{\partial R2} = -\dfrac{R2\dfrac{\partial cB2}{\partial R2} + \cos B2}{t2 - t1} \quad (242)$$

iv. Compute the partial derivative of target speed with respect to range at t1 with respect to the sensor associated with time line 1

$\left(\dfrac{\partial v}{\partial R1}\right)$ and the partial derivative of target speed with respect to range at t2 with respect to the sensor associated with time line 2

$\left(\dfrac{\partial v}{\partial R2}\right)$:

$$\dfrac{\partial v}{\partial R1} = \dfrac{Vxt\dfrac{\partial Vxt}{\partial R1} + Vyt\dfrac{\partial Vyt}{\partial R1}}{\sqrt{Vxt^2 + Vyt^2}} \quad (243)$$

$$\dfrac{\partial v}{\partial R2} = \dfrac{Vxt\dfrac{\partial Vxt}{\partial R2} + Vyt\dfrac{\partial Vyt}{\partial R2}}{\sqrt{Vxt^2 + Vyt^2}} \quad (244)$$

v. Compute the estimated target speed:

$$V = \sqrt{Vxt^2 + Vyt^2} \quad (245)$$

vi. Compute the speed residual (RESv):

$$RESv = Vc - V \quad (246)$$

where Vc is the assumed target speed.

vii. Compute the normalized speed residual ($\overline{RESv}$) and normalized partial derivatives $\left(\dfrac{\overline{\partial v}}{\partial R1}, \dfrac{\overline{\partial v}}{\partial R2}\right)$ $$\overline{RESv} = \dfrac{RESv}{\sigma v} \quad (247)$$

$$\dfrac{\overline{\partial v}}{\partial R1} = \dfrac{\dfrac{\partial v}{\partial R1}}{\sigma v} \quad (248)$$

$$\dfrac{\overline{\partial v}}{\partial R2} = \dfrac{\dfrac{\partial v}{\partial R2}}{\sigma v} \quad (249)$$

where $\sigma v$ is the standard deviation of the assumed target speed.

viii. If frequency data are not being processed, set the next row of the augmented Jacobian H matrix to:

$$\left[\dfrac{\overline{\partial v}}{\partial R1} \; \dfrac{\overline{\partial v}}{\partial R2} \; \overline{RESv}\right] \quad (250)$$

If frequency data are being processed, set the next row of the augmented Jacobian H matrix to:

$$\left[\dfrac{\overline{\partial v}}{\partial R1} \; \dfrac{\overline{\partial v}}{\partial R2} \; 0 \; \overline{RESv}\right] \quad (251)$$

f. Reorder the rows of the H matrix such that a zero-valued partial derivative does not appear along the diagonal.

g. Perform the Householder transformation on the m-by-ns+1 matrix H:

i. Compute values of s, μ, and β as:

$$s = -sgn(H(1,1))\left(\sum_{i=1}^{m}[H(i,1)^2]\right) \quad (252)$$

$$u(1) = H(1,1) - s \quad (253)$$

$$u(i) = H(i,1) \; i=2,\ldots,m \quad (254)$$

$$\beta = \dfrac{1}{su(1)} \quad (255)$$

ii. For j=2, ..., ns+1, evaluate the following equations (apply Householder transformation to the successive columns of H):

$$\gamma = \beta \sum_{i=1}^{m} u(i) H(i,j) \quad (256)$$

$$H(i,j) = H(i,j) + \gamma u(i) \; i=1,\ldots,m \quad (257)$$

h. Extract the upper triangular matrix R from the upper left hand corner of the transformed matrix H:

$$R(i,i)=H(i,i) i=1,\ldots,ns \qquad (258)$$

i. Compute $R^{-1}$ by back substitution:
   i. Compute $R^{-1}$ (1,1) as follows:

$$R^{-1}(1, 1) = \frac{1}{R(1, 1)} \qquad (259)$$

ii. For j=2, ..., ns perform the following:

$$U(j, j) = \frac{1}{R(j, j)} \qquad (260)$$

$$U(k, j) = -\left(\sum_{l=k}^{j-1} U(k, l)R(l, j)\right)U(j, j), k = 1, \ldots, j-1 \qquad (261)$$

j. Set the Y vector to the last column of the transformed matrix H:

$$Y(i)=H(i,n+1) i=1,\ldots,ns \qquad (262)$$

k. Compute the gain vector (G):

$$G=R^{-1}Y \qquad (263)$$

l. Determine if the gain vector is near zero. If both $|G(1)|$ and $|G(2)|$ are less than or equal to 0.1, then the algorithm has converged and Gauss-Newton iterations shall terminate, and processing shall resume as described in paragraph g.
Otherwise, processing shall continue as described below.

m. Limit the range changes such that the updated range estimates will be within bounds as follows:
   i. If $|G(1)|>10000$ or $|G(2)|>10000$, perform the following calculations up to twenty times which divide $\Delta R1$ and $\Delta R2$ by 2 until the updated range estimates will be within bounds:

$$\alpha=1 \text{(Initialization)} \qquad (264)$$

$$R1_{temp}=R1+\alpha G(1) \qquad (265)$$

$$R2_{temp}=R2+\alpha G(2) \qquad (266)$$

If $R1_{min}<R1_{temp}<R1_{max}$ and $R2_{min}<R2_{temp}<R2_{max}$, update gain vector as follows:

$$G=\alpha G \qquad (267)$$

and continue as described in paragraph 16n below. Otherwise, divide $\alpha$ by 2 and repeat the process.

ii. If $|G(1)|<10000$ or $|G(2)|<10000$, perform the following calculations up to twenty times which decreases $\Delta R1$ and $\Delta R2$ by 5% until the updated range estimates will be within bounds:

$$ii=0 \text{(Initialization)} \qquad (268)$$

$$\alpha = \frac{100 - 5ii + 5}{100} \qquad (269)$$

$$R1_{temp}=R1+\alpha G(1) \qquad (270)$$

$$R2_{temp}=R2+\alpha G(2) \qquad (271)$$

If $R1_{min}<R1_{temp}<R1_{max}$ and $R2_{min}<R2_{temp}<R2_{max}$, update gain vector as follows:

$$G=\alpha G \qquad (272)$$

and continue as described in paragraph 16 below. Otherwise, increase ii by 1 and repeat the process.

n. Compute the stepsize (s) via the quadratic fit type line search as follows:
   i. This following procedure provides a method for selecting the stepsize $a_l$ in the modified Gauss-Newton iterative formula $$x_{l+1}=x_l+a_l\Delta x_l \qquad (273)$$

where $\Delta x_l$ is the correction vector. Actually, because it is not normalized, the correction $\Delta x_l$ also contributes to the size of the step. It is convenient to redefine equation (273) as $$x_{l+1}=x_l+a_j\Delta x_l \qquad (274)$$

where $a_j$ denotes the jth value of the step size at the lth Gauss-Newton iteration.

ii. Once $\Delta x_l$ is found from the Gauss-Newton equations, the performance index $PI_l$ is a function only of $a_j$, $$PI_l(a_j)=PI_l(x_l+a_j\Delta x_l) \qquad (275)$$

and this is minimized by a judicious selection of $a_j$. Here, $a_j$ is defined by the minimum of a quadratic polynomial which passes through three data points $(a_j, PI(a_j), j=1, 2, 3)$. For equally spaced values of $a_j$, the step size occurring at the minimum of this quadratic is given by $$a_m = \frac{(a_2 + a_3)PI_l(a_1) - 2(a_1 + a_3)PI_l(a_2) + (a_2 + a_1)PI_l(a_3)}{2PI_l(a_1) - 4PI_l(a_2) + 2PI_l(a_3)} \qquad (276)$$

where $a_3>a_2\geq 0$.

iii. The first of these data points is readily available, namely, $a_1=(0,PI_l(x_1))$; and if $$PI_l(1)<PI_l(0), \qquad (277)$$

then $a_2=1$ gives the second data point and $a_3=2a_2$ gives the third. However, if equation (302) is not satisfied, the length of the interval is reduced by selecting $a_2=\frac{1}{2}$ and $a_3=2a_2=1$, provided $$PI_l(\frac{1}{2})<PI_l(0) \qquad (278)$$

iv. If this is successful, the next selection is $a_2=\frac{1}{4}$ and $a_3=2a_2=\frac{1}{2}$, and subsequent selections are given by repeatedly dividing $a_2$ by 2. This continues until $PI_l(a_2)<PI_l(a_1)$ or a threshold is crossed which causes termination of the line search. After $a_m$ is found, then $PI_l(a_m)$, $PI_l(a_1)$ and $PI_l(a_3)$ are compared to determine which of these is the smallest. This is necessary because the quadratic polynomial may not always provide a good fit to the cost function and $PI_l(a_2)$ or $PI_l(a_3)$ may be smaller than $PI_l(a_m)$.

o. Update the states using the selected stepsize:
   i. Update the range states:

$$R1_{new}=R1_{old}+sG(1) \qquad (279)$$

$$R2_{new}=R2_{old}+sG(2) \qquad (280)$$

and insure $R1_{min}+0.1<R1_{new}<R1_{max}-0.1$ and $R2_{min}+0.1<R2_{new}<R2_{max}-0.1$.

ii. If frequency data is being processed update the frequency state:

$$Fb_{new} = Fb_{old} + sG(3) \quad (281)$$

and insure $1 < Fb_{new}$.

p. Compute the new performance index ($PI_{new}$) based on the updated states ($R1_{new}, R2_{new}, Fb_{new}$).

q. Compute range, bearing, course and speed at tc:
  i. Compute the x-component of target velocity (Vxt) and the y-component of target velocity (Vyt):

$$Vxt = \frac{R2\sin B2 + Xs2 - R1\sin B1 - Xs1}{t2 - t1} \quad (282)$$

$$Vyt = \frac{R2\cos B2 + Ys2 - R1\cos B1 - Ys1}{t2 - t1} \quad (283)$$

ii. Compute target course (Ct) and target speed (Vt):

$$Ct = \tan^{-1}\left(\frac{Vxt}{Vyt}\right) \quad (284)$$

$$Vt = \sqrt{Vxt^2 + Vyt^2} \quad (285)$$

iii. Compute x-component of target position at tc (Xtc) and y-component of target position at tc (Ytc):

$$Xtc = R2 \sin B2 + Xs2 + Vxt(t2 - tc) \quad (286)$$

$$Ytc = R2 \cos B2 + Ys2 + Vyt(t2 - tc) \quad (287)$$

iv. Compute x-component of range at tc with respect to own ship (Rxoc) and y-component of range at tc with respect to own ship (Ryoc):

$$Rxoc = Xtc - Xoc \quad (289)$$

$$Ryoc = Ytc - Yoc \quad (290)$$

v. Compute range at tc with respect to own ship (Roc) and true bearing at tc with respect to own ship (Boc):

$$Roc = \sqrt{Rxoc^2 + Ryoc^2} \quad (291)$$

$$Boc = \tan^{-1}\left(\frac{Rxoc}{Ryoc}\right) \quad (292)$$

vi. Limit the range at tc with respect to own ship to the maximum target range constraint.

Propagation path hypothesis testing can be performed by the endpoint MLE algorithm on up to a maximum of four data segments which may be from different sonar arrays, and the endpoint MLE algorithm is capable of processing an additional six azimuthal bearings only or azimuthal bearing/horizontal range segments (from any array) which may be direct path only. Each segment which contains either conical angle or frequency measurements is tested to determine whether the best propagation path is a direct path or is a bottom bounce single ray reversal path. Propagation path testing is performed by Alternating the propagation path for each segment to be tested from a direct path to a bottom bounce path, running the endpoint MLE algorithm for each propagation path combination and each appropriate port/starboard combination and by saving the four best solution based on the performance index, along with the associated port/starboard indicators at the time lines and propagation paths for each segment. Thus, if there are four conical angle only segments and six azimuthal bearing segments, then the endpoint MLE may be invoked up to sixty-four times if testing all possible port/starboard combinations. If the selected time lines are associated with conical angle measurement and bearing measurements are available close in time to the conical angle measurements which can remove all port/starboard ambiguity, then the endpoint MLE will tie down to the bearing measurements and port/starboard hypothesis testing will not be performed.

Once the endpoint MLE has computed the four best solutions, the best solution is used to initialize the Cartesian coordinate MLE which will refine the solution using the optimal propagation path combinations. The Cartesian coordinate MLE shall be allowed to change the port/starboard designations if a particular part/starboard combination has been specified.

Cartesian Coordinate MLE

1. Initialize the number of Gauss-Newton iterations to zero.

2. Determine the number of state variables as follows:
   If at least three frequency measurements are available, then frequency data will be processed, target base frequency shall be estimated and the number of state variables (ns) shall be set to five. Otherwise the number of state variables shall be four, frequency data shall not be processed and target base frequency shall not be estimated.

3. Initialize values for x-coordinate of target position at tm (Xtm), y-component of target position at tm (Ytm), x-component of target velocity (Vxt) and y-component of target velocity (Vyt) using the outputs from the Endpoint MLE as follows:

$$Xtm = Roc \sin Boc + Xoc - Vxt(tc - tm) \quad (293)$$

$$Ytm = Roc \cos Boc + Yoc - Vyt(tc - tm) \quad (294)$$

$$Vxt = Vt \sin Ct \quad (295)$$

$$Vyt = Vt \cos Ct \quad (296)$$

where Roc is the range at tc with respect to own ship
  Boc is the true bearing at tc with respect to own ship
  Ct is the target course
  Vt is the target speed
  Xoc is the x-coordinate of own ship position at tc
  Yoc is the y-coordinate of own ship position at tc
  tm is the time of the most recent measurement
  tc is current time If frequency data are being processed, initialize the base frequency (Fb) to the base frequency output by the endpoint MLE.

4. Compute the Cartesian coordinate performance index (PI) based on the initial states as follows:
   a. First, for each measurement in the batch:
     i. Compute the x-component of range at $t_i$ with respect to the sensor associated with the ith measurement ($Rx_i$) and the y-component of range at $t_i$ with respect to the sensor associated with the ith measurement ($Ry_i$):

$$Rx_i = Xtm - Vxt(tm - t_i) - Xo_i \quad (297)$$

$$Ry_i = Ytm - Vyt(tm - t_i) - Yo_i \quad (298)$$

where $Xo_i$ is x-coordinate of own ship position at $t_i$
$Yo_i$ is y-coordinate of own ship position at $t_i$
$t_i$ is the time of the ith measurement
tm is the time of the latest measurement ii. Compute the range at $t_i$ with respect to the sensor associated with the ith measurement ($R_i$):

$$R_i = \sqrt{Rx_i^2 + Ry_i^2} \tag{299}$$

iii. Compute the target image depth at $t_i$ with respect to the sensor associated with the ith measurement ($Rz_i$) and D/E angle at $t_i$ with respect to the sensor associated with the ith measurement ($\theta_i$).

iv. If the ith measurement is an azimuthal bearing:
  1.) Compute the true bearing at $t_i$ with respect to the sensor associated with the ith measurement ($B_i$):

$$B_i = \tan^{-1}\left(\frac{Rx_i}{Ry_i}\right) \tag{300}$$

2.) Compute the bearing residual ($RESb_i$) such that $-\pi \leq RESb_i \leq \pi$:

$$RESb_i = Bm_i - B_i \tag{301}$$

where $Bm_i$ is the ith measured bearing

3.) Compute the normalized bearing residual ($\overline{RESb_i}$):

$$\overline{RESb_i} = \frac{RESb_i}{\sigma b_i} \tag{302}$$

where $\sigma b_i$ is the measured bearing standard deviation v. If the ith measurement is a conical angle:
  1.) Compute the target image depth at $t_i$ with respect to the sensor associated with the ith measurement ($Rz_i$) and D/E angle at $t_i$ with respect to the sensor associated with the ith measurement ($\theta_i$).
  2.) If the D/E angle associated with the conical angle measurement is valid:
    a. Compute the true bearing at $t_i$ with respect to the sensor associated with the ith measurement ($B_i$):

$$B_i = \tan^{-1}\left(\frac{Rx_i}{Ry_i}\right) \tag{303}$$

b. Compute the slant range at $t_i$ with respect to the sensor associated with the ith measurement ($Rs_i$):

$$Rs_i = \sqrt{Rx_i^2 + Ry_i^2 + Rz_i^2} \tag{304}$$

c. Compute the conical angle at $t_i$ with respect to the sensor associated with the ith measurement ($\beta_i$):

$$\beta_i = \cos^{-1}\left(\frac{(\cos Cs_i(Rx_i \sin Hs_i + Ry_i \cos Hs_i) - \sin Cs_i Rz_i)}{Rs_i}\right) \tag{305}$$

where $Cs_i$ is the sensor cant angle at the ith measurement
    $Hs_i$ is the sensor heading at the ith measurement d. Compute the conical angle ($RES\beta_i$) such that $-\pi \leq RES\beta_i \leq \pi$:

$$RES\beta_i = \beta m_i - \beta_i \tag{306}$$

where $\beta m_i$ is the ith measured conical angle e. Compute the normalized conical angle residual ($\overline{RES\beta_i}$):

$$\overline{RESb_i} = \frac{RESb_i}{\sigma b_i} \tag{307}$$

where $\sigma \beta_i$ is the measured conical angle standard deviation.

vi. If the ith measurement is a range:
  1.) Compute the range residual ($RESr_i$):

$$RESr_i = Rm_i - R_i \tag{308}$$

where $Rm_i$ is the ith measured range

2.) Compute the normalized range residual ($\overline{RESr_i}$):

$$\overline{RESr_i} = \frac{RESr_i}{\sigma r_i} \tag{309}$$

where $\sigma r_i$ is the measured range standard deviation vii. If frequency data are being processed and the ith measurement is a frequency:
  1.) Compute the x-component of target relative velocity at $t_i$ with respect to the sensor associated with the ith measurement ($Vx_i$) and the y-component of target relative velocity at $t_i$ with respect to the sensor associated with the ith measurement ($Vy_i$):

$$Vx_i = Vxt - Vxs_i \tag{310}$$

$$Vy_i = Vyt - Vys_i \tag{311}$$

where $Vxs_i$ is the x-component of sensor velocity at $t_i$
  $Vys_i$ is the y-component of sensor velocity at $t_i$ 2.) Compute the target image depth at $t_i$ with respect to the sensor associated with the ith measurement ($Rz_i$) and D/E angle at $t_i$ with respect to the sensor associated with the ith measurement ($\theta_i$)

3.) If the D/E angle associated with the frequency is valid, compute the slant range at $t_i$ with respect to the sensor associated with the ith measurement ($Rs_i$):

$$Rs_i = \sqrt{R_i^2 + Rz_i^2} \tag{312}$$

4.) Compute the estimated frequency at $t_i$ with respect to the sensor associated with the ith measurement:

$$f_i = Fb \frac{cRs_i + Vxs_i Rx_i + Vys_i Ry_i}{cRs_i + VxtRx_i + VytRy_i} \tag{313}$$

5.) Compute the frequency residual ($RESf_i$)

$$RESf_i = fm_i - f_i \tag{314}$$

where $fm_i$ is the ith measured frequency

6.) Compute the normalized frequency residual ($\overline{RESf_i}$):

$$\overline{RESf_i} = \frac{RESf_i}{\sigma f_i} \quad (315)$$

where $\sigma f_i$ is the measured frequency standard deviation.

b. If a range constraint is being imposed, then the following computations shall be performed:

i. Compute the range residual (RESr):

$$RESr = Rc - R \quad (316)$$

where Rc is the assumed target range ii. Compute the normalized speed residual ($\overline{RESr}$):

$$\overline{RESr} = \frac{RESr}{\sigma R} \quad (317)$$

where $\sigma R$ is the assumed target range standard deviation.

c. If a speed constraint is being imposed, then the following computations shall be performed.

i. Compute the estimated target speed:

$$V = \sqrt{Vxt^2 + Vyt^2} \quad (318)$$

ii. Compute the speed residual (RESv):

$$RESv = Vc - V \quad (319)$$

where Vc is the assumed target speed iii. Compute the normalized speed residual ($\overline{RESv}$):

$$\overline{RESv} = \frac{RESv}{\sigma V} \quad (320)$$

where $\sigma V$ is the assumed target speed standard deviation.

d. Compute the performance index as one half of the sum of the squared normalized residuals.

5. Gauss-Newton iterations shall be performed as described in paragraphs a through n below, until the algorithm converges as described in paragraph n or until twenty-five iterations have been performed.

a. For each measurement in the batch:

i. Compute the x-component of range at $t_i$ with respect to the sensor associated with the ith measurement ($Rx_i$) and the y-component of range at $t_i$ with respect to the sensor associated with the ith measurement ($Ry_i$):

$$Rx_i = Xtm - Vxt(tm - t_i) - Xo_i \quad (321)$$

$$Ry_i = Ytm - Vyt(tm - t_i) - Yo_i \quad (322)$$

where $Xo_i$ is x-coordinate of own ship position at $t_i$
$Yo_i$ is y-coordinate of own ship position at $t_i$
$t_i$ is the time of the ith measurement ii. Compute the range at $t_i$ with respect to the sensor associated with the ith measurement ($R_i$):

$$R_i = \sqrt{Rx_i^2 + Ry_i^2} \quad (323)$$

iii. Compute the target image depth at $t_i$ with respect to the sensor associated with the ith measurement ($Rz_i$) and D/E angle at $t_i$ with respect to the sensor associated with the ith measurement ($\theta_i$)

iv. If the ith measurement is an azimuthal bearing:

1.) Compute the partial derivative of true bearing at $t_i$ with respect to the sensor associated with the ith measurement with respect to the x-coordinate of target position at $$t_m \left( \frac{\partial B_i}{\partial Xtm} \right),$$

the partial derivative of true bearing at $t_i$ with respect to the sensor associated with the ith measurement with respect to the y-coordinate of target position at $t_m$ $$\left( \frac{\partial B_i}{\partial Ytm} \right),$$

the partial derivative of true bearing at $t_i$ with respect to the sensor associated with the ith measurement with respect to the x-component of target velocity $$\left( \frac{\partial B_i}{\partial Vxt} \right),$$

and the partial derivative of true bearing at $t_i$ with respect to the sensor associated with the ith measurement with respect to the y-component of target velocity $$\left( \frac{\partial B_i}{\partial Vyt} \right):$$

$$\frac{\partial B_i}{\partial Xtm} = \frac{Ry_i}{R_i^2} \quad (324)$$

$$\frac{\partial B_i}{\partial Ytm} = -\frac{Rx_i}{R_i^2} \quad (325)$$

$$\frac{\partial B_i}{\partial Vxt} = -(t_m - t_i) \frac{\partial B_i}{\partial Xtm} \quad (326)$$

$$\frac{\partial B_i}{\partial Vyt} = -(t_m - t_i) \frac{\partial B_i}{\partial Ytm} \quad (327)$$

2.) Compute the bearing residual ($RESb_i$) such that $-\pi \leq RESb_i \leq \pi$:

$$RESb_i = Bm_i - B_i \quad (328)$$

where $Bm_i$ is the ith measured bearing

3.) Compute the normalized bearing residual ($\overline{RESb_i}$) and normalized partial derivative $$\left(\overline{\frac{\partial B_i}{\partial Xtm}}, \overline{\frac{\partial B_i}{\partial Ytm}}, \overline{\frac{\partial B_i}{\partial Vxt}}, \overline{\frac{\partial B_i}{\partial Vyt}}\right):$$

$$\overline{RESb_i} = \frac{RESb_i}{\sigma b_i} \quad (329)$$

$$\overline{\frac{\partial B_i}{\partial Xtm}} = \frac{\frac{\partial B_i}{\partial Xtm}}{\sigma b_i} \quad (330)$$

$$\overline{\frac{\partial B_i}{\partial Ytm}} = \frac{\frac{\partial B_i}{\partial Ytm}}{\sigma b_i} \quad (331)$$

$$\overline{\frac{\partial B_i}{\partial Vxt}} = \frac{\frac{\partial B_i}{\partial Vxt}}{\sigma b_i} \quad (332)$$

$$\overline{\frac{\partial B_i}{\partial Vyt}} = \frac{\frac{\partial B_i}{\partial Vyt}}{\sigma b_i} \quad (333)$$

where $\sigma b_i$ is the measured bearing standard deviation

4.) If frequency data are not being processed, then set the next row of the augmented Jacobian matrix H to:

$$\left[\overline{\frac{\partial B_i}{\partial Xtm}} \; \overline{\frac{\partial B_i}{\partial Ytm}} \; \overline{\frac{\partial B_i}{\partial Vxt}} \; \overline{\frac{\partial B_i}{\partial Vyt}} \; \overline{RESB_i}\right] \quad (334)$$

If frequency data are being processed, then set the next row of the augmented Jacobian matrix H to:

$$\left[\overline{\frac{\partial B_i}{\partial Xtm}} \; \overline{\frac{\partial B_i}{\partial Ytm}} \; \overline{\frac{\partial B_i}{\partial Vxt}} \; \overline{\frac{\partial B_i}{\partial Vyt}} \; 0 \; \overline{RESB_i}\right] \quad (335)$$

v. If the ith measurement is a conical angle:
  1.) Compute the target image depth at $t_i$ with respect to the sensor associated with the ith measurement ($Rz_i$) and D/E angle at $t_i$ with respect to the sensor associated with the ith measurement ($\theta_i$).
  2.) If the D/E angle associated with the conical angle measurement is valid:
    a Compute the true bearing at $t_i$ with respect to the sensor associated with the ith measurement ($B_i$):

$$B_i = \tan^{-1}\left(\frac{Rx_i}{Ry_i}\right) \quad (336)$$

b Compute the slant range at $t_i$ with respect to the sensor associated with the ith measurement ($Rs_i$):

$$Rs_i = \sqrt{Rx_i^2 + Ry_i^2 + Rz_i^2} \quad (337)$$

c Compute the conical angle at $t_i$ with respect to the sensor associated with the ith measurement ($\beta_i$):

$$\beta_i = \cos^{-2}\left(\frac{(\cos Cs_i(Rx_i \sin Hs_i + Ry_i \cos Hs_i) - \sin Cs_i Rz_i)}{Rs_i}\right) \quad (338)$$

where $Cs_i$ is the sensor cant angle at the ith measurement and $Hs_i$ is the sensor heading at the ith measurement d Compute the partial derivative of conical angle at $t_i$ with respect to the sensor associated with the ith measurement with respect to the x-coordinate of target position at $t_m$ $$\left(\frac{\partial \beta_i}{\partial Xtm}\right),$$

the partial derivative of conical angle at $t_i$ with respect to the sensor associated with the ith measurement with respect to the y-coordinate of target position at tm $$\left(\frac{\partial \beta_i}{\partial Ytm}\right),$$

the partial derivative of conical angle at $t_i$ with respect to the sensor associated with the ith measurement with respect to the x-component of target velocity $$\left(\frac{\partial \beta_i}{\partial Vxt}\right),$$

and the partial derivative of conical angle at $t_i$ with respect to the sensor associated with the ith measurement with respect to the y-component of target velocity $$\left(\frac{\partial \beta_i}{\partial Vyt}\right):$$

$$\frac{\partial \beta_i}{\partial Xtm} = -\frac{(\cos Cs_i((Ry_i^2 + Rz_i^2)\sin Hs_i - Rx_i Ry_i \cos Hs_i) + Rx_i Rz_i \sin Cs_i)}{\sin \beta_i R_i^3} \quad (339)$$

$$\frac{\partial \beta_i}{\partial Ytm} = -\frac{(\cos Cs_i((Rx_i^2 + Rz_i^2)\cos Hs_i - Rx_i Ry_i \sin Hs_i) + Ry_i Rz_i \sin Cs_i)}{\sin \beta_i R_i^3} \quad (340)$$

$$\frac{\partial \beta_i}{\partial Vxt} = -(t_m - t_i)\frac{\partial \beta_i}{\partial Xtm} \quad (341)$$

$$\frac{\partial \beta_i}{\partial Vyt} = -(t_m - t_i)\frac{\partial \beta_i}{\partial Ytm} \quad (342)$$

e Compute the conical angle (RESβ$_i$) such that $-\pi \leq RES\beta_i \leq \pi$:

$$RES\beta_i = \beta m_i - \beta_i \qquad (343)$$

where βm$_i$ is the ith measured conical angle.

f Compute the normalized conical angle residual ($\overline{RES\beta_i}$) and normalized partial derivatives $$\left(\overline{\frac{\partial \beta_i}{\partial Xtm}}, \overline{\frac{\partial \beta_i}{\partial Ytm}}, \overline{\frac{\partial \beta_i}{\partial Vxt}}, \overline{\frac{\partial \beta_i}{\partial Vyt}}\right):$$

$$\overline{RES\beta_i} = \frac{RES\beta_i}{\sigma\beta_i} \qquad (344)$$

$$\overline{\frac{\partial \beta_i}{\partial Xtm}} = \frac{\frac{\partial \beta_i}{\partial Xtm}}{\sigma\beta_i} \qquad (345)$$

$$\overline{\frac{\partial \beta_i}{\partial Ytm}} = \frac{\frac{\partial \beta_i}{\partial Ytm}}{\sigma\beta_i} \qquad (346)$$

$$\overline{\frac{\partial \beta_i}{\partial Vxt}} = \frac{\frac{\partial \beta_i}{\partial Vxt}}{\sigma\beta_i} \qquad (347)$$

$$\overline{\frac{\partial \beta_i}{\partial Vyt}} = \frac{\frac{\partial \beta_i}{\partial Vyt}}{\sigma\beta_i} \qquad (348)$$

where σβ$_I$ is the measured conical angle standard deviation g If frequency data are not being processed, set the next row of the augmented Jacobian matrix H to:

$$\left[\overline{\frac{\partial B_i}{\partial Xtm}} \; \overline{\frac{\partial B_i}{\partial Ytm}} \; \overline{\frac{\partial B_i}{\partial Vxt}} \; \overline{\frac{\partial B_i}{\partial Vyt}} \; \overline{RES\beta_i}\right] \qquad (349)$$

If frequency data are being processed, then set the next row of the augmented Jacobian matrix H to:

$$\left[\overline{\frac{\partial B_i}{\partial Xtm}} \; \overline{\frac{\partial B_i}{\partial Ytm}} \; \overline{\frac{\partial B_i}{\partial Vxt}} \; \overline{\frac{\partial B_i}{\partial Vyt}} \; 0 \; \overline{RES\beta_i}\right] \qquad (350)$$

vi. If the ith measurement is a range:

1.) Compute the partial derivative of range at t$_i$ with respect to the sensor associated with the ith measurement with respect to the x-coordinate of target position at t$_m$ $$\left(\frac{\partial R_i}{\partial Xtm}\right),$$

the partial derivative of range at t$_i$ with respect to the sensor associated with the ith measurement with respect to the y-coordinate of target position at t$_m$ $$\left(\frac{\partial R_i}{\partial Ytm}\right),$$

the partial derivative of range at t$_i$ with respect to the sensor associated with the ith measurement with respect to the x-component of target velocity $$\left(\frac{\partial R_i}{\partial Vxt}\right),$$

and the partial derivative of range at t$_i$ with respect to the sensor associated with the ith measurement with respect to the y-component of target velocity $$\left(\frac{\partial R_i}{\partial Vyt}\right):$$

$$\frac{\partial R_i}{\partial Xtm} = \frac{Rx_i}{R_i} \qquad (351)$$

$$\frac{\partial R_i}{\partial Ytm} = \frac{Ry_i}{R_i} \qquad (352)$$

$$\frac{\partial R_i}{\partial Vxt} = -(t_m - t_i)\frac{\partial R_i}{\partial Xtm} \qquad (353)$$

$$\frac{\partial R_i}{\partial Vyt} = -(t_m - t_i)\frac{\partial R_i}{\partial Ytm} \qquad (354)$$

2.) Compute the range residual (RESr$_i$):

$$RESr_i = Rm_i - R_i \qquad (355)$$

where Rm$_i$ is the ith measured range

3.) Compute the normalized range residual ($\overline{RESr_i}$) and normalized partial derivative $$\left(\overline{\frac{\partial R_i}{\partial Xtm}}, \overline{\frac{\partial R_i}{\partial Ytm}}, \overline{\frac{\partial R_i}{\partial Vxt}}, \overline{\frac{\partial R_i}{\partial Vyt}}\right):$$

$$\overline{RESr_i} = \frac{RESr_i}{\sigma r_i} \qquad (356)$$

$$\overline{\frac{\partial R_i}{\partial Xtm}} = \frac{\frac{\partial R_i}{\partial Xtm}}{\sigma r_i} \qquad (357)$$

$$\overline{\frac{\partial R_i}{\partial Ytm}} = \frac{\frac{\partial R_i}{\partial Ytm}}{\sigma r_i} \qquad (358)$$

$$\overline{\frac{\partial R_i}{\partial Vxt}} = \frac{\frac{\partial R_i}{\partial Vxt}}{\sigma r_i} \qquad (359)$$

$$\overline{\frac{\partial R_i}{\partial Vyt}} = \frac{\frac{\partial R_i}{\partial Vyt}}{\sigma r_i} \qquad (360)$$

where σr$_i$ is the measured range standard deviation.

4.) If frequency data are not being processed, then set the next row of the augmented Jacobian matrix H to:

$$\left[\frac{\partial R_i}{\partial Xtm} \quad \frac{\partial R_i}{\partial Ytm} \quad \frac{\partial R_i}{\partial Vxt} \quad \frac{\partial R_i}{\partial Vyt} \quad \overline{RESr_i}\right] \quad (361)$$

If frequency data are being processed, then set the next row of the augmented Jacobian matrix H to:

$$\left[\frac{\partial R_i}{\partial Xtm} \quad \frac{\partial R_i}{\partial Ytm} \quad \frac{\partial R_i}{\partial Vxt} \quad \frac{\partial R_i}{\partial Vyt} \quad 0 \quad \overline{RESr_i}\right] \quad (362)$$

vii. If frequency data are being processed and the ith measurement is a frequency:
  1.) Compute the x-component of target relative velocity at $t_i$ with respect to the sensor associated with the ith measurement ($Vx_i$) and the y-component of target relative velocity at $t_i$ with respect to the sensor associated with the ith measurement ($Vy_i$):

$$Vx_i = Vxt - Vxs_i \quad (363)$$

$$Vy_i = Vyt - Vys_i \quad (364)$$

where $Vxs_i$ is the x-component of sensor velocity at $t_i$ and $Vys_i$ is the y-component of sensor velocity at $t_i$.
  2.) Compute the target image depth at $t_i$ with respect to the sensor associated with the ith measurement ($Rz_i$) and D/E angle at $t_i$ with respect to the sensor associated with the ith measurement ($\theta_i$).
  3.) If the D/E angle associated with the frequency is valid, compute the slant range at $t_i$ with respect to the sensor associated with the ith measurement ($Rs_i$):

$$Rs_i = \sqrt{R_i^2 + Rz_i^2} \quad (365)$$

4.) Compute the partial derivative of frequency at $t_i$ with respect to the sensor associated with the ith measurement with respect to the x-coordinate of target position at $t_m$ $$\left(\frac{\partial f_i}{\partial Xtm}\right),$$

the partial derivative of frequency at $t_i$ with respect to the sensor associated with the ith measurement with respect to the y-coordinate of target position at $t_m$ $$\left(\frac{\partial f_i}{\partial Ytm}\right),$$

the partial derivative of frequency at $t_i$ with respect to the sensor associated with the ith measurement with respect to the x-component of target velocity $$\left(\frac{\partial f_i}{\partial Vxt}\right),$$

the partial derivative of frequency at $t_i$ with respect to the sensor associated with the ith measurement with respect to the y-component of target velocity $$\left(\frac{\partial f_i}{\partial Vyt}\right)$$

and the partial derivative of frequency at $t_i$ with respect to the sensor associated with the ith measurement with respect to base frequency $$\left(\frac{\partial f_i}{\partial Fb}\right):$$

$$\frac{\partial f_i}{\partial Xtm} = \frac{Fb}{(cRs_i + Vxs_i Rx_i + Vys_i Ry_i + Rx_i Vx_i + Ry_i Vy_i)^2} \cdot \quad (366)$$
$$\left((Rx_i Vx_i + Ry_i Vy_i)\left(\frac{c}{Rs_i} Rx_i + Vxs_i\right) - (cRs_i + Vxs_i Rx_i + Vys_i Ry_i)Vx_i\right)$$

$$\frac{\partial f_i}{\partial Ytm} = \frac{Fb}{(cRs_i + Vxs_i Rx_i + Vys_i Ry_i + Rx_i Vx_i + Ry_i Vy_i)^2} \cdot \quad (367)$$
$$\left((Rx_i Vx_i + Ry_i Vy_i)\left(\frac{c}{Rs_i} Ry_i + Vys_i\right) - (cRs_i + Vxs_i Rx_i + Vys_i Ry_i)Vy_i\right)$$

$$\frac{\partial f_i}{\partial Vxt} = -(t_m - t_i)\frac{\partial f_i}{\partial Xtm} \quad (368)$$

$$\frac{\partial f_i}{\partial Vyt} = -(t_m - t_i)\frac{\partial f_i}{\partial Ytm} \quad (369)$$

$$\frac{\partial f_i}{\partial Fb} = \frac{cRs_i + Vxs_i Rx_i + Vys_i Ry_i}{(cRs_i + Vxs_i Rx_i + Vys_i Ry_i + Rx_i Vx_i + Ry_i Vy_i)} \quad (370)$$

where c is the average speed of sound
  5.) Compute the estimated frequency at $t_i$ with respect to the sensor associated with the ith measurement:

$$f_i = Fb \frac{cRs_i + Vxs_i Rx_i + Vys_i Ry_i}{cRs_i + Vxt Rx_i + Vyt Ry_i} \quad (371)$$

6.) Compute the frequency residual ($RESf_i$):

$$RESf_i = fm_i - f_i \quad (372)$$

where $fm_i$ is the ith measured frequency
  7.) Compute the normalized frequency residual ($\overline{RESf_i}$) and normalized partial derivatives $$\left[\frac{\partial f_i}{\partial Xtm}, \frac{\partial f_i}{\partial Ytm}, \frac{\partial f_i}{\partial Vxt}, \frac{\partial f_i}{\partial Vyt}, \frac{\partial f_i}{\partial Fb}\right]:$$

$$\overline{\frac{\partial f_i}{\partial Xtm}} = \frac{\frac{\partial f_i}{\partial Xtm}}{\sigma f_i} \quad (374)$$

$$\overline{\frac{\partial f_i}{\partial Ytm}} = \frac{\frac{\partial f_i}{\partial Ytm}}{\sigma f_i} \quad (375)$$

-continued $$\frac{\overline{\partial f_i}}{\partial Vxt} = \frac{\frac{\partial f_i}{\partial Vxt}}{\sigma f_i} \tag{376}$$

$$\frac{\overline{\partial f_i}}{\partial Vyt} = \frac{\frac{\partial f_i}{\partial Vyt}}{\sigma f_i} \tag{377}$$

$$\frac{\overline{\partial f_i}}{\partial Fb} = \frac{\frac{\partial f_i}{\partial Fb}}{\sigma f_i} \tag{378}$$

where $\sigma f_i$ is the measured frequency standard deviation.

8.) Set the next row of the augmented Jacobian matrix H to:

$$\left[ \frac{\overline{\partial f_i}}{\partial Xtm} \; \frac{\overline{\partial f_i}}{\partial Ytm} \; \frac{\overline{\partial f_i}}{\partial Vxt} \; \frac{\overline{\partial f_i}}{\partial Vyt} \; \frac{\overline{\partial f_i}}{\partial Fb} \overline{RESf_i} \right] \tag{379}$$

b. If a range constraint is being imposed, the following computations shall be performed:

i. Compute the partial derivative of range at $t_i$ with respect to the sensor associated with the ith measurement with respect to the x-coordinate of target position at $t_m$ $$\left( \frac{\partial R_i}{\partial Xtm} \right),$$

the partial derivative of range at $t_i$ with respect to the sensor associated with the ith measurement with respect to the y-coordinate of target position at $t_m$ $$\left( \frac{\partial R_i}{\partial Ytm} \right),$$

the partial derivative of range at $t_i$ with respect to the sensor associated with the ith measurement with respect to the x-component of target velocity $$\left( \frac{\partial R_i}{\partial Vxt} \right),$$

and the partial derivative of range at $t_i$ with respect to the sensor associated with the ith measurement with respect to the y-component of target velocity $$\left( \frac{\partial R_i}{\partial Vyt} \right):$$

$$\frac{\partial R_i}{\partial Xtm} = \frac{Rx_i}{R_i} \tag{380}$$

$$\frac{\partial R_i}{\partial Ytm} = \frac{Ry_i}{R_i} \tag{381}$$

$$\frac{\partial R_i}{\partial Vxt} = -(t_m - t_i) \frac{\partial R_i}{\partial Xtm} \tag{382}$$

$$\frac{\partial R_i}{\partial Vyt} = -(t_m - t_i) \frac{\partial R_i}{\partial Ytm} \tag{383}$$

ii. Compute the range residual ($RESr_i$):

$$RESr_i = Rc - R \tag{384}$$

where Rc is the assumed target range iii. Compute the normalized range residual ($\overline{RESr_i}$) and normalized partial derivatives $$\left[ \frac{\overline{\partial R_i}}{\partial Xtm}, \frac{\overline{\partial R_i}}{\partial Ytm}, \frac{\overline{\partial R_i}}{\partial Vxt}, \frac{\overline{\partial R_i}}{\partial Vyt} \right]:$$

$$\overline{RESr_i} = \frac{RESr_i}{\sigma R} \tag{385}$$

$$\frac{\overline{\partial R_i}}{\partial Xtm} = \frac{\frac{\partial R_i}{\partial Xtm}}{\sigma R} \tag{386}$$

$$\frac{\overline{\partial R_i}}{\partial Ytm} = \frac{\frac{\partial R_i}{\partial Ytm}}{\sigma R} \tag{387}$$

$$\frac{\overline{\partial R_i}}{\partial Vxt} = \frac{\frac{\partial R_i}{\partial Vxt}}{\sigma R} \tag{388}$$

$$\frac{\overline{\partial R_i}}{\partial Vyt} = \frac{\frac{\partial R_i}{\partial Vyt}}{\sigma R} \tag{389}$$

where $\sigma R$ is the measured range standard deviation.

iv. If frequency data are not being processed, then set the next row of the augmented Jacobian matrix H to:

$$\left[ \frac{\overline{\partial R_i}}{\partial Xtm} \; \frac{\overline{\partial R_i}}{\partial Ytm} \; \frac{\overline{\partial R_i}}{\partial Vxt} \; \frac{\overline{\partial R_i}}{\partial Vyt} \overline{RESr_i} \right] \tag{390}$$

If frequency data are being processed, then set the next row of the augmented Jacobian matrix H to:

$$\left[ \frac{\overline{\partial R_i}}{\partial Xtm} \; \frac{\overline{\partial R_i}}{\partial Ytm} \; \frac{\overline{\partial R_i}}{\partial Vxt} \; \frac{\overline{\partial R_i}}{\partial Vyt} \; 0 \; \overline{RESr_i} \right] \tag{391}$$

c. If a speed constraint is being imposed, the following computations shall be performed:

i. Compute the estimated target speed:

$$V + \sqrt{Vxt^2 + Vyt^2} \tag{392}$$

ii. Compute the partial derivative of target speed with respect to the x-coordinate of target position at $t_m$ $$\left( \frac{\partial V}{\partial Xtm} \right),$$

the partial derivative of target speed with respect to the y-coordinate of target position at $t_m$ $\left(\frac{\partial V}{\partial Ytm}\right)$, the partial derivative of target speed with respect to the x-component of target velocity $\left(\frac{\partial V}{\partial Vxt}\right)$ and the partial derivative of target speed with respect to the y-component of target velocity $\left(\frac{\partial V}{\partial Vyt}\right)$:

$$\frac{\partial V}{\partial Xtm} = 0 \tag{393}$$

$$\frac{\partial V}{\partial Ytm} = 0 \tag{394}$$

$$\frac{\partial V}{\partial Vxt} = \frac{Vxt}{V} \tag{395}$$

$$\frac{\partial V}{\partial Vyt} = \frac{Vyt}{V} \tag{396}$$

iii. Compute the speed residual (RESv):

$$RES_v = Vc - V \tag{397}$$

where Vc is the assumed target speed iv. Compute the normalized speed residual ($\overline{RESv}$) and normalized partial derivatives $\left[\frac{\partial V}{\partial Xtm}, \frac{\partial V}{\partial Ytm}, \frac{\partial V}{\partial Vxt}, \frac{\partial V}{\partial Vyt}\right]$:

$$\overline{RESv} = \frac{RESv}{\sigma R} \tag{398}$$

$$\overline{\frac{\partial V}{\partial Xtm}} = \frac{\frac{\partial V}{\partial Xtm}}{\sigma V} \tag{399}$$

$$\overline{\frac{\partial V}{\partial Ytm}} = \frac{\frac{\partial V}{\partial Ytm}}{\sigma V} \tag{400}$$

$$\overline{\frac{\partial V}{\partial Vxt}} = \frac{\frac{\partial V}{\partial Vxt}}{\sigma V} \tag{401}$$

$$\overline{\frac{\partial V}{\partial Vyt}} = \frac{\frac{\partial V}{\partial Vyt}}{\sigma V} \tag{402}$$

where σV is the assumed target speed standard deviation.

v. If frequency data are not being processed, then set the next row of the augmented Jacobian matrix H to:

$$\left[\overline{\frac{\partial V}{\partial Xtm}} \quad \overline{\frac{\partial V}{\partial Ytm}} \quad \overline{\frac{\partial V}{\partial Vxt}} \quad \overline{\frac{\partial V}{\partial Vyt}} \quad \overline{RESv}\right] \tag{403}$$

If frequency data are being processed, then set the next row of the augmented Jacobian matrix H to:

$$\left[\overline{\frac{\partial V}{\partial Xtm}} \quad \overline{\frac{\partial V}{\partial Ytm}} \quad \overline{\frac{\partial V}{\partial Vxt}} \quad \overline{\frac{\partial V}{\partial Vyt}} \quad 0 \quad \overline{RESv}\right] \tag{404}$$

d. Reorder the rows of the matrix H such that a zero valued partial derivative does not appear along the diagonal.

e. Perform the Householder transformation on the m×n+1 matrix H.

f. Extract the upper triangular matrix R from the upper left hand corner of the transformed matrix H.

g. Compute $R^{-1}$ by back-substitution.

h. Extract the Y vector from the upper right hand corner of the transformed matrix H.

i. Compute the gain vector (G):

$$G = R^{-1}Y \tag{405}$$

j. Determine if the gain is near zero. If both |G(1)| and |G(2)| are less than 0.1 and |G(3)| and |G(4)| are less than 0.01, then the algorithm has converged, Gauss Newton iterations shall terminate, and processing shall be performed as described in paragraph 6. Otherwise, processing shall continue as described below.

k. Compute the stepsize as described in n. above.

l. Update the states using the optimal stepsize(s):
  i. Update the position and velocity states:

$$Xtm = Xtm + sG(1) \tag{406}$$

$$Ytm = Ytm + sG(2) \tag{407}$$

$$Vxt = Vxt + sG(3) \tag{408}$$

$$Vyt = Vyt + sG(4) \tag{409}$$

ii. If frequency data are being processed, update the frequency state:

$$Fb = Fb + sG(5) \tag{410}$$

iii Compute range with respect to own ship at $t_m$ (Rom) and target speed (Vt) as $$Rom = \sqrt{(Xtm - Xom)^2 + (Ytm - Yom)^2} \tag{411}$$

$$Vt = \sqrt{Vxt^2 + Vyt^2} \tag{412}$$

iv. Insure $R_{min} + 0.1 < Rom < R_{max}$ and $V_{min} + 0.1 < Vt < V_{max}$. If either Rm or Vt is out of bounds, limit the appropriate parameter and recompute Xtm, Ytm, Vxt and Vyt.

m. Compute the new performance index ($PI_{new}$) based on the updated states (Xtm, Ytm, Vxt, Vyt, Fb)

n. Compute range, bearing, course and speed at current time:
   i. Compute target course (Ct) and target speed (Vt):

$$Ct = \tan^{-1}\left(\frac{Vxt}{Vyt}\right) \quad (413)$$

$$Vt = \sqrt{Vxt^2 + Vyt^2} \quad (414)$$

ii. Compute x-coordinate of target position at tc(Xtc) and y-coordinate of target position at tc(Ytc):

$$Xtc = Xtm + Vxt(tc-tm) \quad (415)$$

$$Ytc = Ytm + Vyt(tc-tm) \quad (416)$$

iii. Compute x-component of range at tc(Rxc) and y-component of range at tc with respect to own ship (Ryc):

$$Rxc = Xtc - Xoc \quad (417)$$

$$Ryc = Ytc - Yoc \quad (418)$$

where Xoc is the x-coordinate of own ship position at tc and Yoc is the y-coordinate of own ship position at tc.

iv. Compute range at tc with respect to own ship (Rc) and true bearing at tc with respect to own ship (Bc):

$$Rc = \sqrt{Rxc^2 + Ryc^2} \quad (419)$$

$$Bc = \tan^{-1}\left(\frac{Rxc}{Ryc}\right) \quad (420)$$

v. Limit range at tc with respect to own ship to a maximum of the target maximum range.
   vi. Limit target speed to a maximum of the target maximum speed.

o. Determine if the change in the performance index is negligible. If so, processing shall terminate, otherwise, Gauss-Newton iterations shall continue.
   i. Compute change in the performance index (ΔPI):

1). If $PI_{old} > 0$, $$\Delta PI = \frac{|PI_{new} - PI_{old}|}{PI_{old}} \quad (421)$$

2.) If $PI_{old} = 0$, $$\Delta PI = 0 \quad (422)$$

ii. If $\Delta PI \leq 0.00001$ and $PI_{new} \leq threshold_{cc}$, stop iterating.

6. Compute the ns by ns Cartesian coordinate covariance matrix:

$$P = R^{-1}R^{-T} \quad (423)$$

7. Extrapolate the covariance matrix forward to current time:
   a. If frequency data are not being processed, the transition matrix Φ shall be defined as follows:

$$\phi = \begin{bmatrix} 1 & 0 & tc-tm & 0 \\ 0 & 1 & 0 & tc-tm \\ 0 & 0 & 1 & 0 \\ 0 & 0 & 0 & 1 \end{bmatrix} \quad (424)$$

b. If frequency data are being processed, the transition matrix Φ shall be defined as follows:

$$\phi = \begin{bmatrix} 1 & 0 & tc-tm & 0 & 0 \\ 0 & 1 & 0 & tc-tm & 0 \\ 0 & 0 & 1 & 0 & 0 \\ 0 & 0 & 0 & 1 & 0 \\ 0 & 0 & 0 & 0 & 1 \end{bmatrix} \quad (425)$$

c. The covariance matrix at tc shall be extrapolated as follows:

$$p = \phi P \phi^T \quad (426)$$

8. Compute target range, bearing, course, speed and base frequency standard deviations:

$$\sigma_R = \sqrt{\frac{P_{11}Rxc^2 + 2P_{12}RxcRyc + P_{22}Ryc^2}{Rc^2}} \quad (427)$$

$$\sigma_B = \sqrt{\frac{P_{11}Ryc^2 - 2P_{12}RxcRyc + P_{22}Rxc^2}{Rc^4}} \quad (428)$$

$$\sigma_C = \sqrt{\frac{P_{33}Vyt^2 - 2P_{34}Vxt*Vyt + P_{44}Vyt^2}{Vt^4}} \quad (429)$$

$$\sigma_S = \sqrt{\frac{P_{33}Vxt^2 + 2P_{34}Vxt*Vyt + P_{44}Vyt^2}{Vt^2}} \quad (430)$$

If frequency data are being processed.

$$\sigma_F = \sqrt{P_{55}} \quad (431)$$

9. Compute major and minor localization ellipse axis length ($X_{maj}$, $X_{min}$) and orientation of major axis from North (ORIEN):

$$\lambda_{maj} = \frac{P_{11} + P_{22} + \sqrt{(P_{11} - P_{22})^2 + 4P_{12}^2}}{2} \quad (432)$$

$$\lambda_{min} = \frac{P_{11} + P_{12} - \sqrt{(P_{11} - P_{22})^2 + 4P_{12}^5}}{2} \quad (433)$$

$$x_{maj} = 2.1459\sqrt{\lambda_{maj}} \quad (434)$$

$$x_{min} = 2.1459\sqrt{\lambda_{min}} \quad (435)$$

$$ORIEN = \tan^{-1}\left[\frac{P_{12}}{\lambda_{maj} - P_{11}}\right] \quad (436)$$

10. Outputting to a display computer.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. A multi-stage target estimation method for underwater and airborne targets, said method comprising the steps of:
   receiving data inputs from a target tracker;
   smoothing angle measurements at the endpoints of the data inputs;
   searching a coarse grid in endpoint coordinates to produce an initial target state estimate at two time lines, the time line 1 and the time line 2;
   performing a Gauss-Newton maximum endpoint coordinate likelihood estimate at the two time lines;
   calculating a Cartesian coordinate maximum likelihood estimate subsequent to said step of performing a Gauss-Newton maximum endpoint coordinate likelihood estimate; and
   outputting a target state to a display computer.

2. A multi-stage target estimation method as in claim 1 wherein said step of coarse grid searching comprises the steps of:
   selecting three frequency measurements from a target sensor and assigning, as a base frequency, a most recent frequency measurement;
   setting a minimum and maximum range at the time line 1 with respect to a sensor associated with the time line 1;
   setting a minimum and maximum range at the time line 2 with respect to a sensor associated with the time line 2;
   computing three values of range at time line 1 with respect to the sensor associated with the time line 1;
   computing three values of range at time line 2 with respect to the sensor associated with the time line 2;
   processing frequency data by computing five base frequency estimates;
   computing an endpoint coordinate performance index for each combination of the computed values of range and the computed base frequency estimates; and
   selecting the initial target state estimate of the computed values of range and the computed base frequency estimate associated with a smallest performance index.

3. A multi-stage target estimation method as in claim 2 wherein said step of performing a Gauss-Newton endpoint coordinate maximum likelihood estimation comprises the steps of:
   initializing values for the range at the time line 1 with respect to the sensor associated with the time line 1 using the estimates from said step of course grid searching;
   initializing values for the range at the time line 2 with respect to the sensor associated with the time line 2 using the estimates from said step of course grid searching;
   initializing the base frequency state using the computed base frequency estimate from said step of course grid searching; and
   performing Gauss-Newton iterations until an endpoint coordinate maximum likelihood is estimated.

4. A multi-stage target estimation method as in claim 3 wherein said step of performing Gauss-type iterations comprises the steps of:
   computing endpoint parameters at the time of measurement of the time lines 1 and 2;
   computing a matrix of partial derivatives;
   performing a Householder transformation on the matrix;
   extracting an upper matrix from the Householder transformed matrix;
   setting a Y vector to a last column of the Householder transformed matrix;
   computing a gain vector; and
   updating the states in which the states represent the endpoint coordinate maximum likelihood estimates at the two time lines.

5. A multi-stage target estimation method as in claim 4 wherein said step of calculating a Cartesian coordinate maximum likelihood estimate comprises the steps of:
   initializing values for an x-coordinate of target position from the Gauss-Newton endpoint coordinate maximum likelihood estimate;
   initializing values for a y-coordinate of target position from the Gauss-Newton endpoint coordinate maximum likelihood estimate;
   initializing values for an x-coordinate of target velocity from the Gauss-Newton endpoint coordinate maximum likelihood estimate;
   initializing values for a y-coordinate of target velocity from the Gauss-Newton endpoint coordinate maximum likelihood estimate; and
   performing Gauss-Newton iterations until the Cartesian coordinate maximum likelihood is estimated.

6. A multi-stage target estimation method as in claim 5 wherein said step of performing Gauss-type iterations for Cartesian coordinate maximum likelihood comprises the steps of:
   computing Cartesian endpoint parameters at the time of measurement of the time lines 1 and 2;
   computing an assigned matrix of partial derivatives;
   performing a Householder transformation on the assigned matrix;
   extracting an upper matrix from the assigned Householder transformed matrix;
   setting an assigned Y vector to a last column of the assigned Householder transformed matrix;
   computing an assigned gain vector; and
   updating the states in which the states represent the Cartesian coordinate maximum likelihood estimates at the two time lines at current time.

7. A multi-stage target estimation method as in claim 6 wherein said step of outputting a target state to a display computer comprises the steps of:
   computing a Cartesian coordinate covariance matrix;
   extrapolating the covariance matrix to current time;
   computing target range;
   computing target bearing;
   computing target course;
   computing target speed;
   computing base frequency standard deviations;
   computing major and minor localization ellipse axis length and orientation of major axis from North; and
   outputting as the target state.

8. A multi-stage target estimation method as in claim 7 wherein said step of coarse grid searching further comprises constraining a target to lie on azimuthal bearing lines.

9. A multi-stage target estimation method as in claim 7 wherein said step of coarse grid searching further comprises constraining a target to lie on conical angle hyperbolas.

10. A multi-stage target estimation method as in claim 7 wherein said step of coarse grid searching further comprises constraining a target to lie on conical angle hyperbolic asymptotes.

* * * * *